Feb. 22, 1955  F. J. SCHUTT ET AL  2,702,629
SEQUENTIALLY CONTROLLED CARD COLLATOR
Filed March 29, 1950  14 Sheets-Sheet 1

INVENTORS
FRIEDRICH J. SCHUTT
AND
JOHN B. DAY
BY
ATTORNEY

FIG. 2

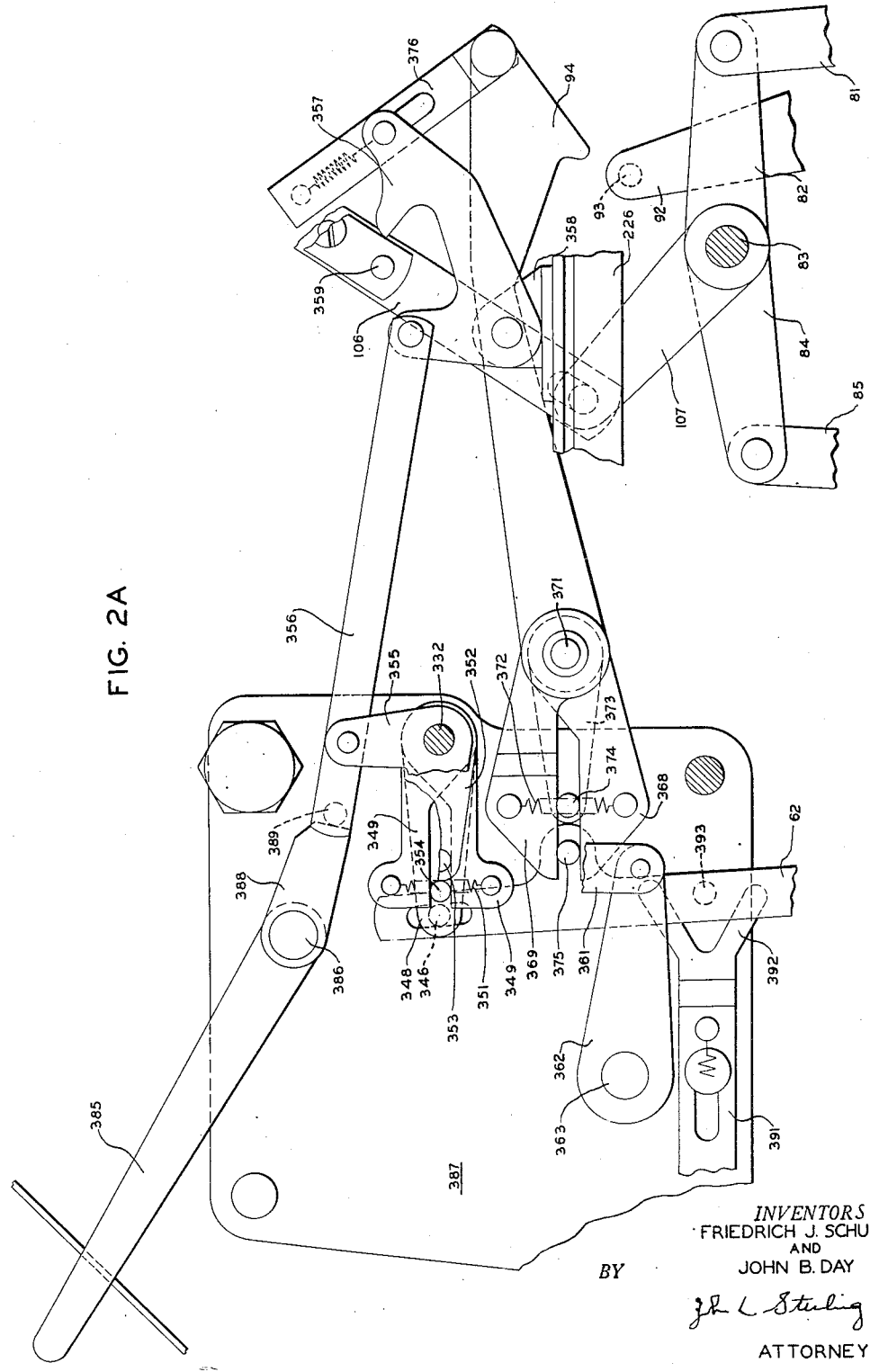

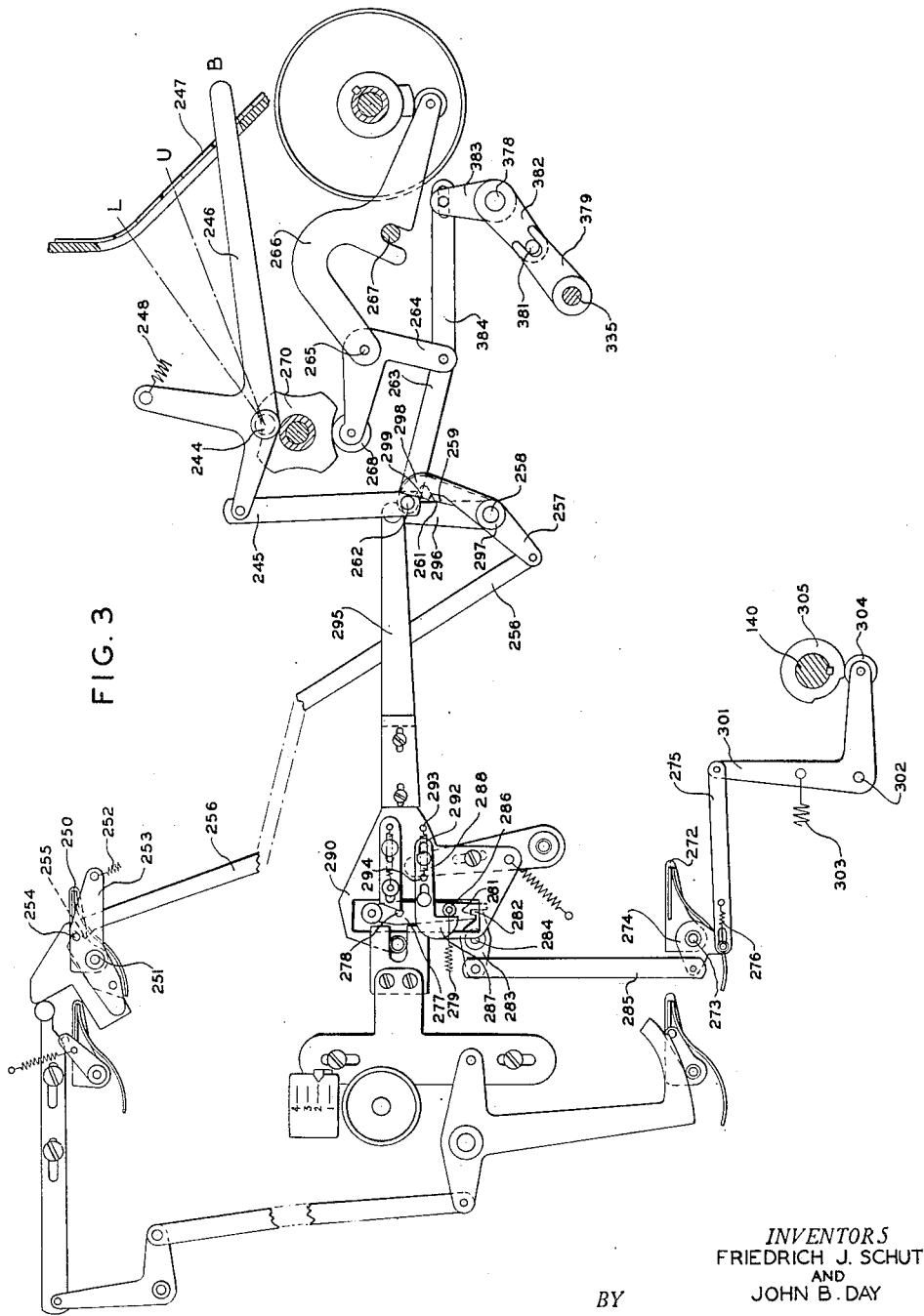

Feb. 22, 1955   F. J. SCHUTT ET AL   2,702,629
SEQUENTIALLY CONTROLLED CARD COLLATOR
Filed March 29, 1950   14 Sheets-Sheet 5

*INVENTORS*
FRIEDRICH J. SCHUTT
AND
JOHN B. DAY

BY

ATTORNEY

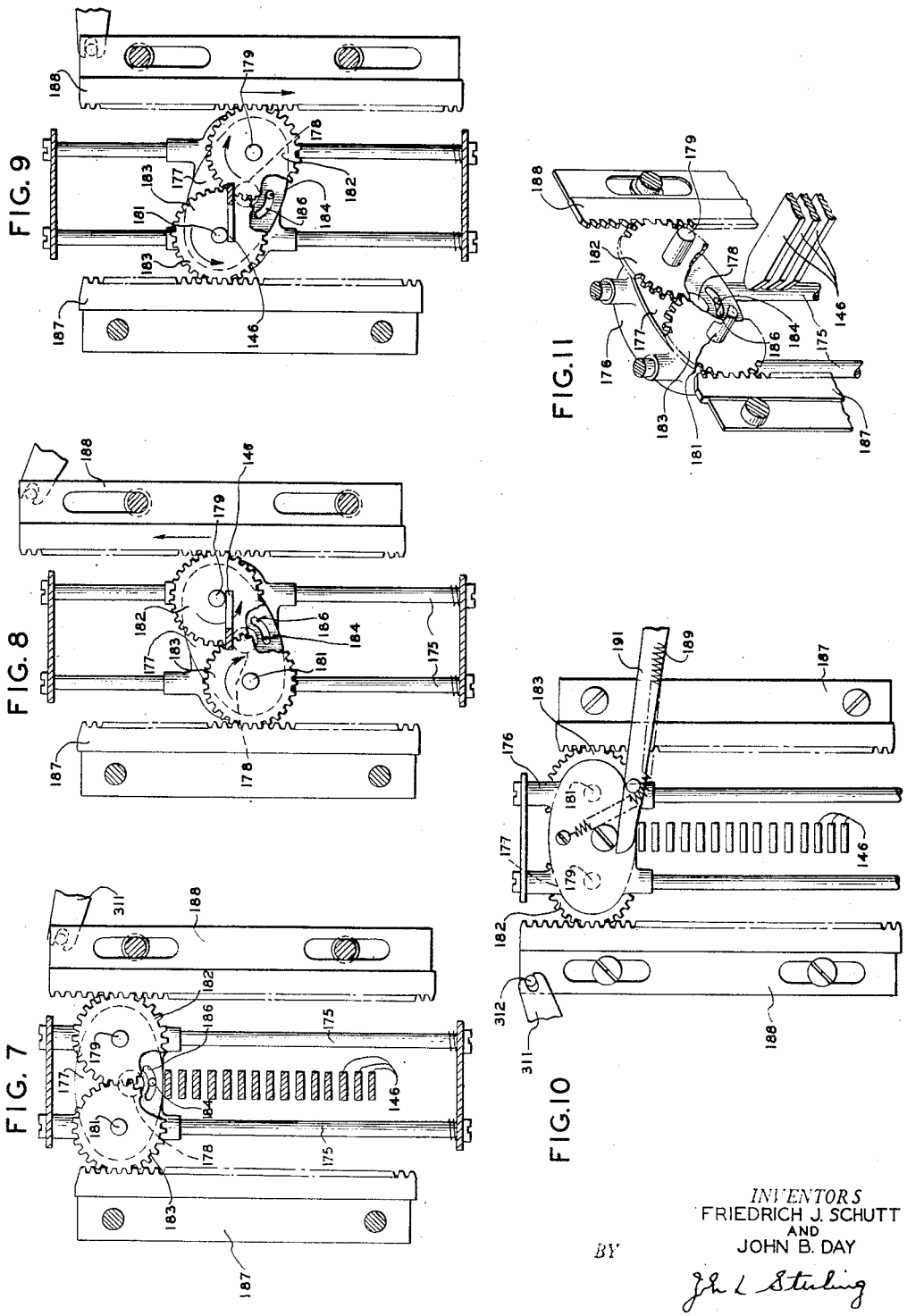

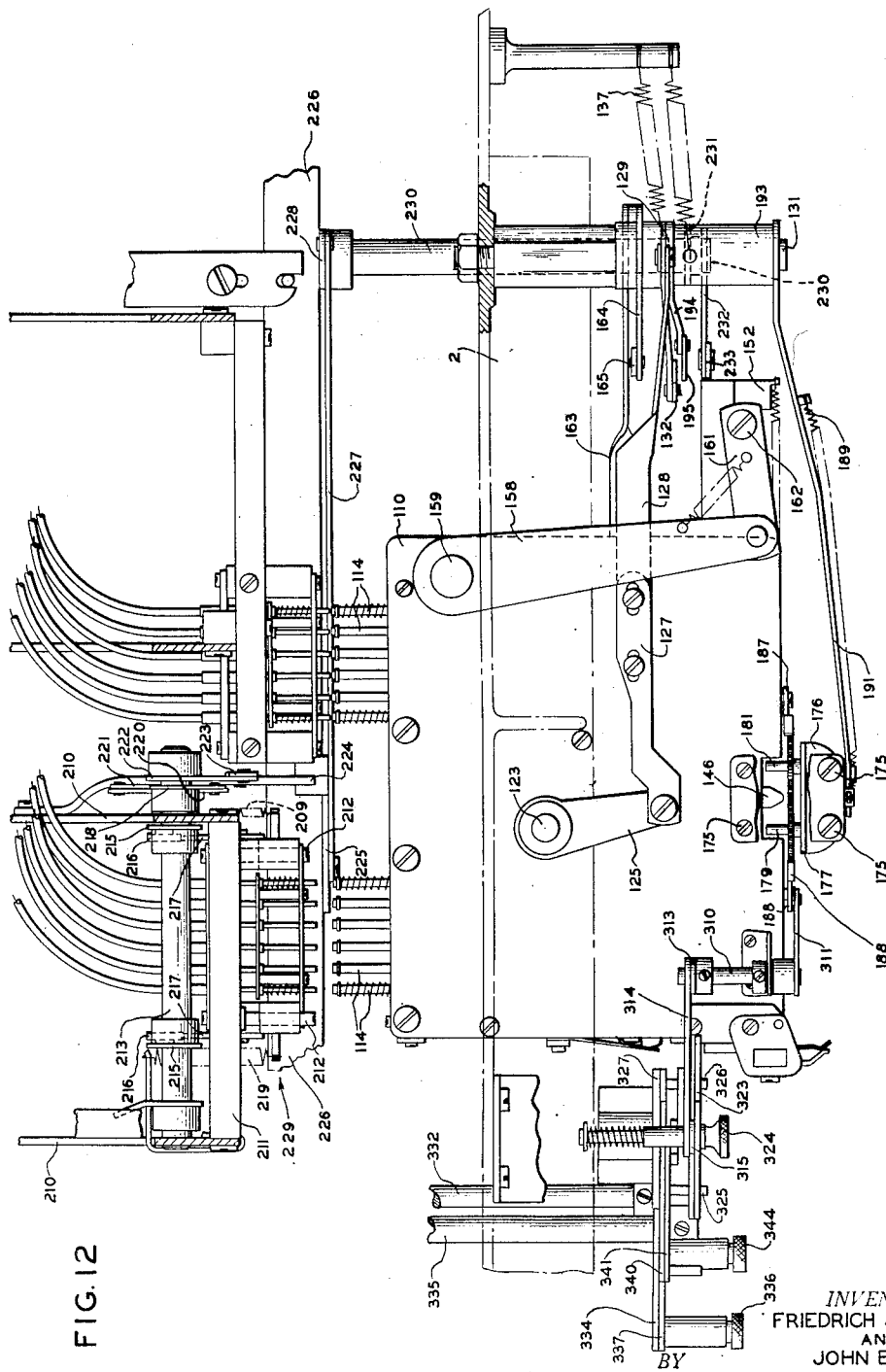

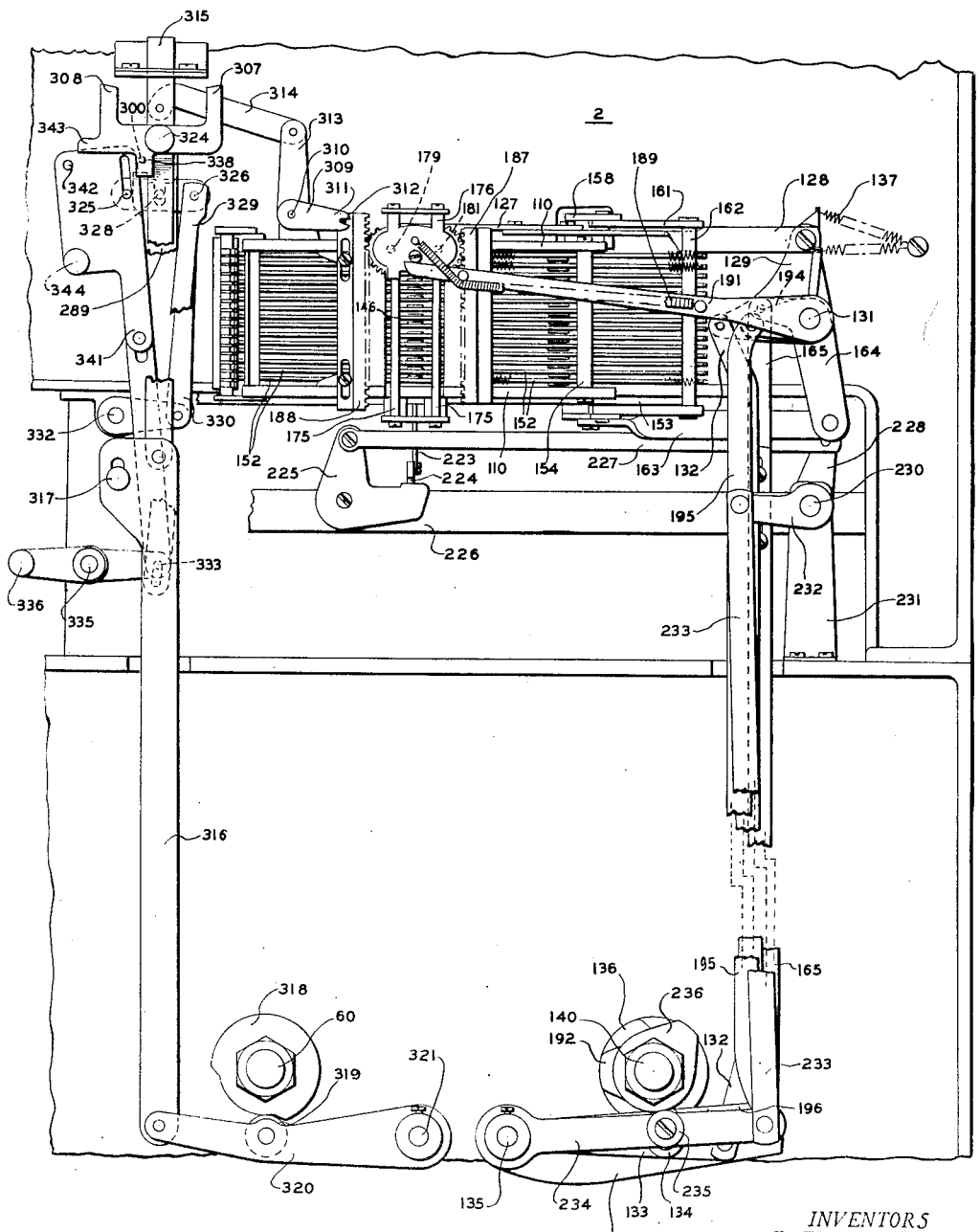

INVENTORS
FRIEDRICH J. SCHUTT
AND
JOHN B. DAY
BY

ATTORNEY

Feb. 22, 1955 F. J. SCHUTT ET AL 2,702,629
SEQUENTIALLY CONTROLLED CARD COLLATOR
Filed March 29, 1950 14 Sheets-Sheet 10

*INVENTORS*
FRIEDRICH J. SCHUTT
AND
JOHN B. DAY
BY

*ATTORNEY*

*INVENTORS*
FRIEDRICH J. SCHUTT
AND
JOHN B. DAY

ATTORNEY

Feb. 22, 1955   F. J. SCHUTT ET AL   2,702,629
SEQUENTIALLY CONTROLLED CARD COLLATOR
Filed March 29, 1950   14 Sheets-Sheet 13
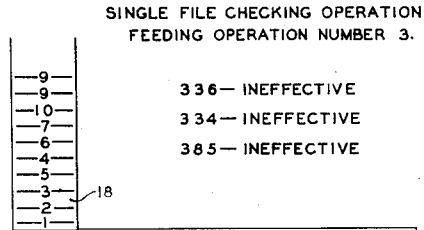
FIG. 20
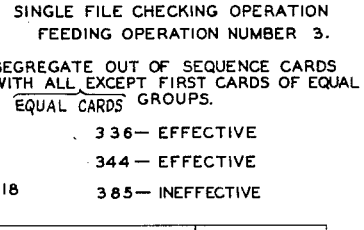
FIG. 21
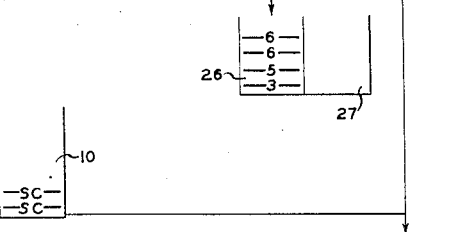
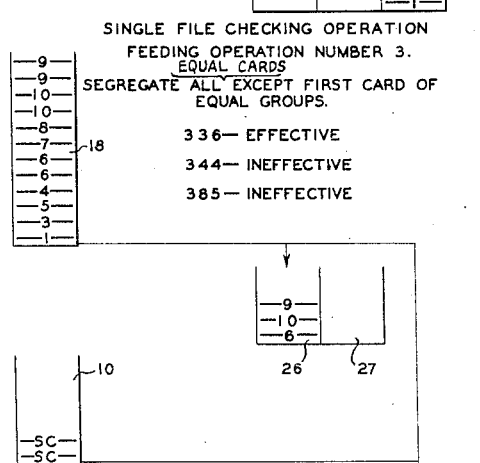
FIG. 22
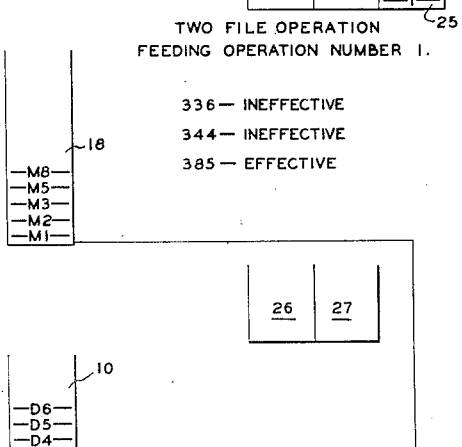
FIG. 23
INVENTORS
FRIEDRICH J. SCHUTT
AND
JOHN B. DAY
BY
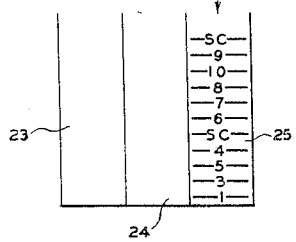
ATTORNEY

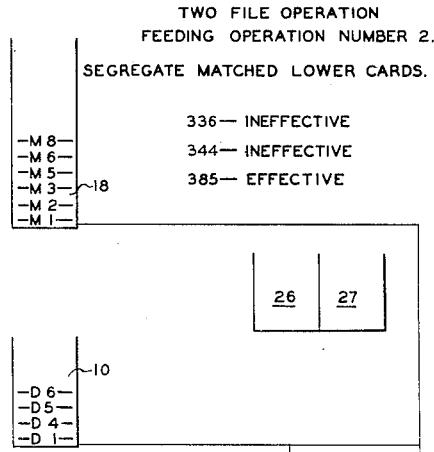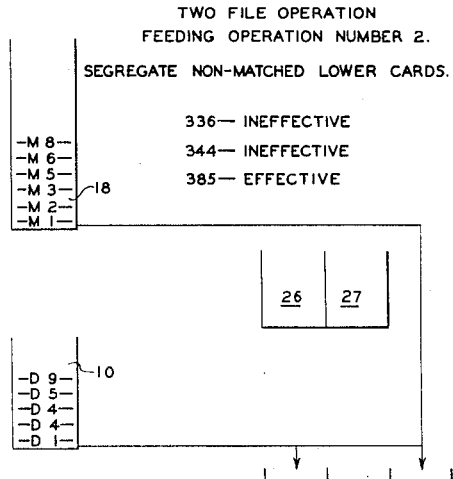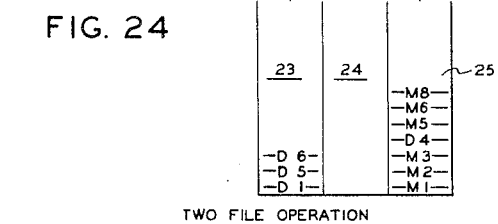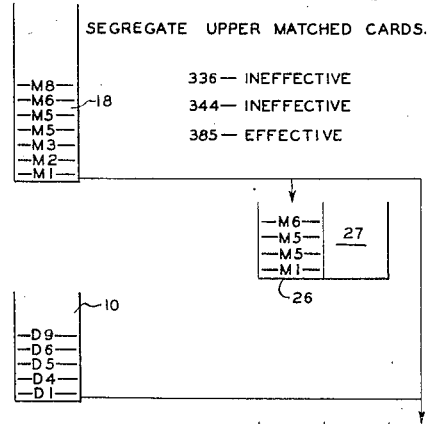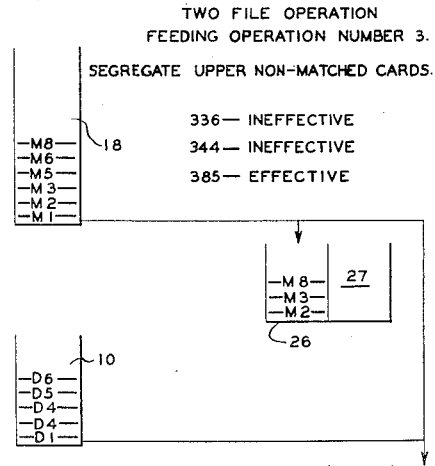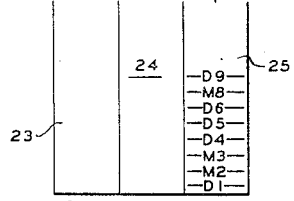

United States Patent Office 2,702,629
Patented Feb. 22, 1955

2,702,629

SEQUENTIALLY CONTROLLED CARD COLLATOR

Friedrich J. Schutt, Brooklyn, N. Y., and John B. Day, Los Angeles, Calif., assignors to Remington Rand Inc., New York, N. Y., a corporation of Delaware Application March 29, 1950, Serial No. 152,728

46 Claims. (Cl. 209—110)

The present invention relates to record controlled machines in general, and particularly to that class of machines for comparing perforation patterns in different records. An embodiment of the invention is shown herein as applied to a statistical card comparing machine such as that disclosed in the Patent 2,211,094 to K. J. Braun dated August 13, 1940, and the Patent 2,496,124 to John T. Ferry dated January 31, 1950, both entitled Statistical Card Comparing Machine.

According to the above mentioned Patent 2,211,094 any one or more of three types of operations can be performed, namely:

1. Record sorting (i. e., to segregate comparing master records from non-comparing master records, and to segregate comparing detail records from non-comparing detail records);
2. Record punching (i. e., to reproduce data contained in the master records, other than that used for comparing purposes, in the detail records); or
3. Stopping the machine (i. e., to permit the insertion of control records at desired points in the run of compared records).

In addition to the foregoing functions, the above machine is also provided with means for effecting eight different types of record feeding operations but for the purpose of this invention only three basic card feeding operations are necessary which are as follows:

(a) To feed the master and detail record simultaneously on a comparison, and on a non-comparison;
(b) To feed detail records only on a comparison and master and detail records simultaneously on a non-comparison;
(c) To feed master records only on a comparison, and master and detail records simultaneously on a non-comparison.

However, the three basic card feeding operations (a), (b), and (c) are modified in the present invention to perform the following basic sequence control card feeding operations:

1. Both upper and lower magazines feed equals (matched cards) with low order feeding of non-matched cards from either upper or lower;
2. Only lower magazine feeds equals (matched cards) with low order feeding of non-matched cards from either upper or lower magazine;
3. Only upper magazine feeds equals (matched cards) with low order feeding of non-matched cards from either upper or lower magazine.

According to the Patent 2,496,124 a sorting control mechanism is provided which may be selectively preset at any one of three different positions, i. e. B (both), U (upper), or L (lower), whereby the deflector mechanism may be operated in a manner to pass the comparing and/or non-comparing records into "receiver" or "eject" pockets as follows:

B. Comparing detail and master records may be passed to their "receiver" pockets, and non-comparing detail and master records may be passed to their "eject" pockets, or, conversely, comparing detail and master records may be passed to their "eject" pockets and non-comparing detail and master records may be passed to their "receiver" pockets.

U. Comparing and non-comparing detail records and comparing master records may be passed to their "receiver" pockets and non-comparing master records may be passed to their "eject" pocket, or conversely, comparing and non-comparing detail records and non-comparing master records may be passed to their "receiver" pockets, and comparing master records may be passed to their "eject" pocket.

L. Comparing and non-comparing master records and comparing detail records may be passed to their "receiver" pockets, and non-comparing detail records may be passed to their "eject" pockets, or, conversely, comparing and non-comparing master records and non-comparing detail records may be passed to their "receiver" pocket and comparing detail records may be passed to their "eject" pocket.

The above mentioned Patent 2,496,124 also provides a fifth receiving pocket, hereinafter called the "interfile" pocket, in which comparing and/or non-comparing detail and master records may be passed in alternate arrangement. The sorting control mechanism provided in said Patent 2,496,124 may be selectively pre-set in any one of four different positions, and is dependent upon the setting of the above mentioned sorting control mechanism, to cause the operation of the deflector mechanism in a manner to pass comparing and/or non-comparing records to the "receiver," "eject," and/or "interfile" pocket as follows:

Position No. 1—The interfiler is rendered inoperative
Position No. 2—Interfile matching cards only
Position No. 3—Interfile all cards matching or non-matching
Position No. 4—Inter-file non-matching cards only Accordingly, the present invention provides a flexible record sequencing device mounted on a multi-control reproducer to control the feeding of cards and prevent "running away," regardless of the fact that either master and/or detail files are incomplete or contain multiple groups of cards. This is accomplished by permitting cards to be fed only from the group having the lowest value when compared. Feeding, punching, and segregating cards of "equal" value is controlled by the standard mechanisms used for that purpose.

Two file operation

When card feeding operation 1 is used, both matched and non-matched cards are fed by both card feeding magazines, and it is possible, therefore, to segregate either matched or non-matched cards from either the upper file or the lower file or both files.

When card feeding operation 2 is used, the lower card feeding magazine feeds on both "match" and "non-match," and these lower cards may, therefore, be segregated on a "match" or "non-match" basis. Card feeding from the upper card magazine occurs only on non-match.

When card feeding operation 3 is used, the upper card feeding magazine feeds on both match and non-match, and these upper cards may, therefore, be segregated on a "match" or "non-match" basis. Card feeding from the lower card feeding magazine occurs only on "non-match."

Single file operation

To perform the single file checking operation, card feeding operation 3 is used. For this type of operation the sequencing device controls the feeding mechanisms so as to feed cards from the upper magazine continuously on both equal and unequal sequence conditions and to feed cards from the lower magazine upon the occurrence of an unequal out of sequence condition. The cards of the lower magazine, being signal cards, are not compared with cards fed from the upper magazine, and when fed and interfiled with the cards fed from the upper magazine indicate the location in the upper card file of the out of sequence condition.

Segregation on the single file operation is controlled herein by the segregation control mechanism of a sequence device so that out of sequence cards, together with all equal cards except first cards of equal groups, are segregated, as well as in another operation wherein only equal cards except the first cards of equal groups may be segregated.

One of the objects of the invention, therefore, is to permit the feed of cards having the lowest denominational value when compared, and interfiling one set of cards with another set of cards according to their sequential order.

Other objects of the invention are to feed a single file of cards to determine whether that file is in sequence; to automatically feed a signal card together with an out of sequence card; and to segregate out of sequence cards and to feed a signal card in its place.

A still further object of the invention is to provide a device, for attachment to existing machines of the type shown in said Patent No. 2,211,094, which is capable of performing a large variety of operations under control of perforated record cards and which is adaptable to many problems which hitherto required manual operation to perform or required a great number of special operations on existing machines to produce a desired file of cards.

Other objects and structural details of the invention will be apparent from the following description when read in connection with the accompanying drawing, in which Fig. 1 shows a cross section of a machine incorporating the card feed and card stop portions of the invention;

Fig. 2 is a perspective view showing the major portion of the mechanism of the invention and its connections to the machine.

Fig. 2A is an enlarged section taken substantially on the line 2A—2A of Fig. 2;

Fig. 3 is a left side view in elevation of the selection control knob and its associated mechanism;

Fig. 7 is a rear view of the cross reading mechanism shown in normal position;

Fig. 8 is a similar view of the cross reading mechanism with a high value signal in detail card sensing;

Fig. 9 is a similar view of the cross reading mechanism with a high signal in master card sensing;

Fig. 10 is a front view of the cross reading mechanism in normal position;

Fig. 11 is a view in perspective of the cross reading mechanism as shown in Fig. 10;

Fig. 12 is a plan view of the sequence unit showing the single deck reciprocating pin box in place;

Fig. 13 is a view in elevation of the right hand portion of the machine incorporating the invention;

Fig. 20 is a schematic chart illustrating the manner in which a single deck of cards is interfiled with signal cards according to their sequential order;

Fig. 21 is a view similar to Fig. 20 showing the manner in which "out of sequence" cards are segregated with all equal cards except the first card of each equal group;

Fig. 22 is similar to Figs. 20 and 21 showing the manner in which all equal cards, except the first card of equal groups, are segregated;

Fig. 23 is a schematic chart illustrating the manner in which two decks of cards are interfiled according to their sequential order;

Fig. 24 is a view similar to Fig. 23 showing the manner in which matched lower or detail cards are segregated;

Fig. 25 is a view similar to Figs. 23 and 24 showing the manner in which non-matched lower or detail cards are segregated;

Fig. 26 is a view similar to Figs. 23, 24, and 25 showing the manner in which matched upper or master cards are segregated; and Fig. 27 is a view similar to Figs. 23 to 26 showing the manner in which non-matched upper or master cards are segregated.

Figure 1:
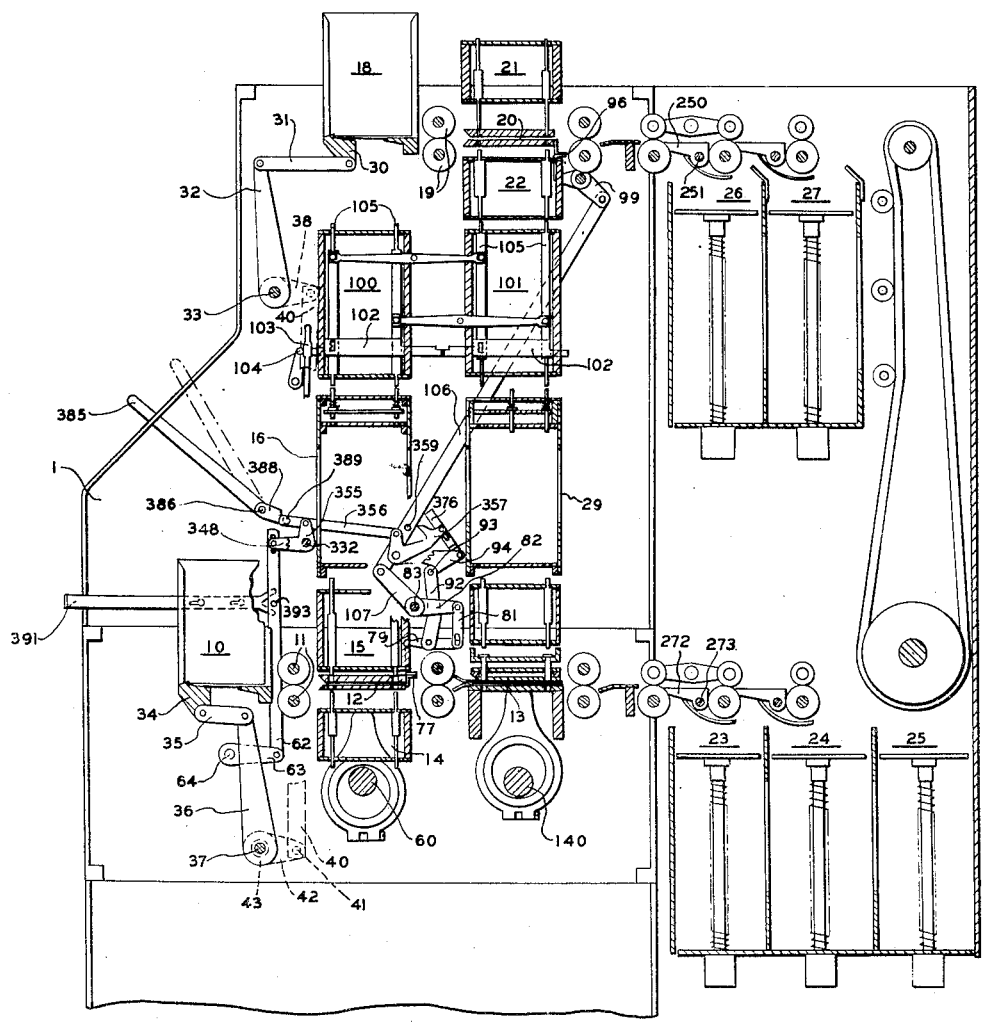

To facilitate an understanding of the present invention, a brief description of that portion of a statistical card comparing machine of the type disclosed in the above mentioned patent and with which the invention is particularly adapted to function, is deemed necessary. For a detailed description of the entire machine, reference may be had to both patents.

In machines of the type disclosed in the patents, detail cards are placed in a detail card magazine 10 which corresponds to the magazine 170 of Patent 2,211,094 (Fig. 26) and are passed seriatim to suitable feed rolls 11 (Fig. 1) whereby they are conveyed, first to the detail card sensing chamber 12 in which their perforated data is analyzed, and, second, to a punch chamber 13 in which additional data may be perforated in the cards. These parts 10, 11, 12, and 13 find their counterparts in the magazine 170, feed rolls 55, sensing chamber 220, and punch chamber 523. From the punch chamber, the detail cards are conveyed to an eject pocket 23, a receiver pocket 24, or an interfiler pocket 25 which find their counterparts in the pockets 28, 27, and 140 of Fig. 14 of Patent 2,496,124. To what pockets the cards go depends upon the setting of the sorting control mechanism is disclosed in the latter patent, and the character of the designative data in the cards. During the period in which a detail card is held in the detail card sensing chamber, the perforation pattern therein is analyzed by the sensing pins mounted in a reciprocating pin box 14 of a detail card sensing mechanism. By this means a mechanical representation of such perforation pattern is transmitted, by pins in an upper pin box 15 and translator wires in a translator 16, to the detail card comparing pin assembly 100 of the comparing mechanism, and to a sequence check mechanism which will hereinafter be described.

Master cards are placed in a master card magazine 18 and are passed seriatim to suitable feed rolls 19 whereby they are conveyed to the master card sensing chamber 20 in which their perforated data is analyzed. From the sensing chamber, the master cards are conveyed to eject pocket 26, receiver pocket 27, or interfiler pocket 25 shown and described in the above mentioned Patent 2,496,124 depending on the setting of the sorting control mechanism and the character of the designative data in the cards. During the period in which a master card is held in the master card sensing chamber 20, the perforation pattern contained therein is analyzed by sensing pins mounted in a reciprocating pin box 21 of the master card sensing mechanism. By this means a mechanical representation of such perforation pattern is transmitted to pins in a master card reading retaining mechanism 22 wherein it is retained, by suitable locking mechanism, until a new master card is sensed. The movement of the pins in the reading retaining mechanism is transmitted directly to the master card comparing pin assembly 101 of the comparing mechanism, and translator wires in a translator 29 to the sequence check mechanism, the operation of which will hereinafter be described.

*Master and detail feeding mechanism*

Figure 6:
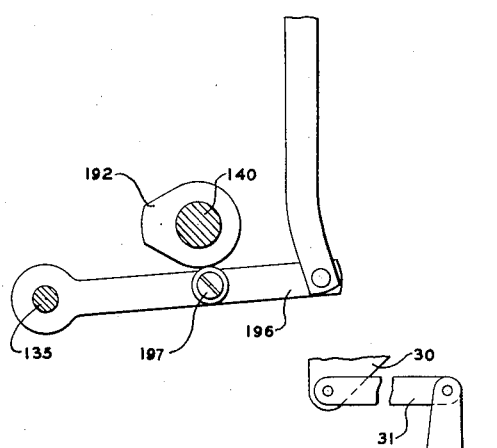
Fig. 6 is a detail view of a portion of the master and detail card feeding mechanisms shown in normal position.

As seen in Figs. 1 and 6, the master card and detail cards are fed by standard picker knives such as is used in Powers machines, and shown in Patent No. 2,211,094. The master card picker blade 30 is operated by the usual picker link 31 and lever 32. Lever 32 is securely fastened to a shaft 33 which runs laterally across the front of the machine and is journaled in the side castings 1 and 2. The detail card picker blade 34 is operated by a similar link 35 and lever 36. The lever 36 is securely fastened at the middle of a shaft 37 which is also journaled in side castings 1 and 2. The cross shaft 33 has securely fastened to its extreme left hand end a short crank arm 38 which pivotally supports the upper end of a long link 40. The lower end of the link 40 is pivotally connected at 41 to a short crank arm 42. The crank arm 42 is fastened to a hub 43, which is fast on an upright arm 44. The hub 43 is loosely mounted upon the shaft 37. Referring to Figs. 1 and 6, it is seen that an upright arm 45, identical to the arm 44, is securely fastened to the shaft 37.

Arms 44 and 45 carry, at their upper ends, pins 46 and these pins are constantly held against shoulders 47 on the slides 48 by a pair of strong springs 50; anchored at their forward ends to studs 51, carried by the arms 44 and 45, and at their rear ends to a stud 52 on the casting 1. The slides 48 are mounted for forward and rearward sliding movement upon a pair of studs 49. The rearmost edges of the slides 48 are thus held in contact with a pair of rollers 54 which are carried on the upper ends of a pair of arms 55. The arms 55 are formed integral with a hub 56 loosely mounted on stud shaft 57, so that the hub 56 and the arms 55 oscillate together as one piece. A picker cam 58 is fast upon the front main operating shaft 60. A follower roller 61 which is fastened on the left hand arm 55 is adapted to ride on the periphery of cam 58. From the foregoing description, it will be understood that, unless one of the slides is held in its forward position, both picker knives will feed cards simultaneously. However, it is sometimes desired to feed cards from either the master card magazine or the detail card magazine without feeding from the other.

Figure 2:
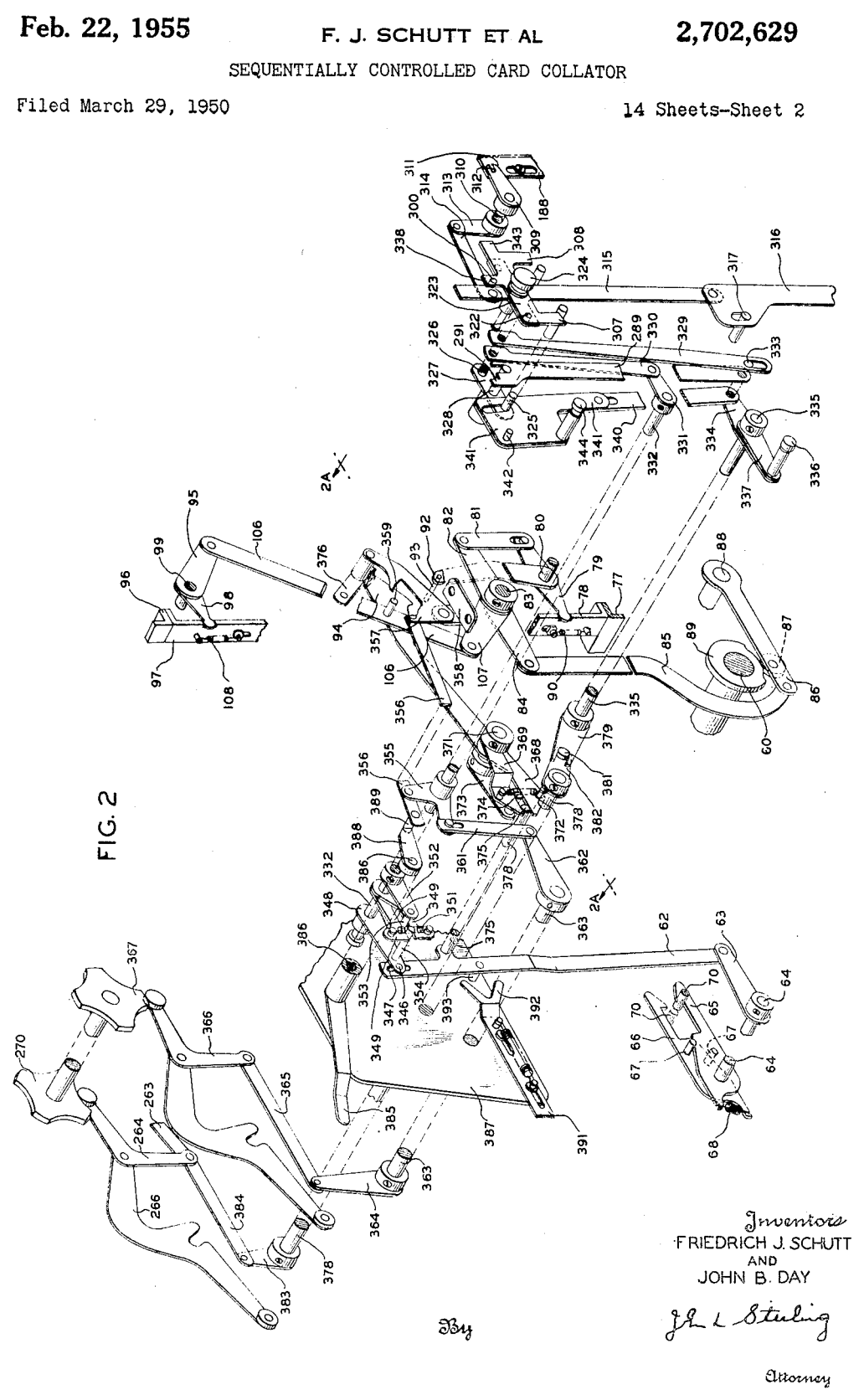

For this purpose, the following mechanism is provided to hold either one of the picker knives inactive by holding one or the other of the slides 48 in its forward position. Referring to Fig. 2, an upright link 62 is pivotally supported at its lower end by a rearwardly extending arm 63 fast upon the right hand end of a short shaft 64 which is journaled in a frame casting. The shaft 64, as shown and described in Patent No. 2,211,094, carries upon its left hand end a hook 65 and an adjacent hook 66, each hook carrying a pin 67. The hooks are urged together by a spring 68 so that their edges contact the pins 67, which pins limit the hooks in such a manner that there is always a definite space between their noses. The hook 65 is fast on the shaft 64 while the hook 66 is loose on said shaft. Axially opposed pins 70 extend from each slide 48 and cooperate with the hooks 65 and 66 to latch or lock out one or the other of the slides 48 and, hence, one or the other of the pickers.

*Detail card sensing and card stop mechanism*

The detail card sensing chamber is of the same construction as that shown in Patent No. 2,211,094. For the purpose of this description the detail card sensing mechanism may be said to include a detail card sensing chamber 12, a reciprocable lower or sensing pin box 14 and a stationary upper pin box 15.

To retain the detail cards in the sensing chamber during the period in which they are sensed, a card stop mechanism is provided (Figs. 1 and 2) including an inverted L-shaped card stop 77, which is guided for vertical movement by the brackets 78. To close card stop 77 during the period in which a detail card is sensed, a pair of arms 79, fastened to each end of a transverse rock shaft 80, extend forwardly into slots in the brackets 78. The other end of arm 79 is joined by a pin-in-slot connection to a link 81 which, in turn, is connected to an arm 82 fast on a rock shaft 83. Shaft 83 is mounted in suitable brackets and is provided with an arm 84 connected by a link 85 to an arm 86, pivoted at 88, having a follower roll 87 cooperating with a card stop cam 89 keyed to the front main operating shaft 60. The arrangement is such, as indicated in Fig. 2, that when follower roll 87 rides on the high dwell of cam 89, the card stop 77 is positively moved downwardly to close the card stop, whereas when roll 87 rides on the low dwell of cam 89 a spring 90 urges the card stop to open position.

Under certain conditions, hereinafter described, it is required that card stop 77 be held in closed position even though urged to open by spring 90. For this purpose, an arm 92 is fixed to rock shaft 80 and is provided with a pin 93 arranged to be engaged by a hooked lever 94 operated by the control mechanism and/or link 62. The hook lever 94 when rocked to its "down" position engages pin 93 to hold card stop 77 in closed position against action of its spring 90. However, the pin-in-slot connection between arm 79 and link 81 permits the rocking of shaft 83 under control of cam 89 for controlling the card stop of the master sensing chamber, as hereinafter described.

*Master card sensing and card stop mechanism*

The master card sensing mechanism used herewith is essentially the same as that disclosed in the above cited Patent 2,211,094. This mechanism is similar in function to the detail card sensing mechanism, in that it serves to sense or analyze the perforation patterns in master cards. For the purposes of this description the master card sensing mechanism may be said to include a master card sensing chamber 20 and a reciprocable upper sensing pin box 21.

To retain the master cards in the sensing chamber during the period in which they are sensed, a card stop mechanism is provided. This device comprises an L-shaped card stop 96, Figs. 1 and 2) guided for vertical movement by brackets 99. To close the card stop 96 during the period in which a master card is sensed, a pair of arms 98, fastened to each end of a transverse rock shaft 99, extend forwardly into slots in the brackets 97. The shaft 99 is rocked by an arm 95 which is connected by a link 106 to an arm 107 fast on the rock shaft 83 of the detail card stop mechanism, which as described hereinabove, is operated by cam 89 on cam shaft 60. Thus, card stop 96 of the master card sensing mechanism is actuated in the same manner and at the same time as card stop 77 of the detail card sensing mechanism. When follower roll 87 rides on the high dwell of cam 89 card stop 96 is positively moved upwardly to close the master card sensing chamber; whereas when roll 87 rides on the low dwell of cam 89, a spring 108 urges the card stop 96 to open position. It will be noted that card stop 96 may be opened and closed, even though the card stop 77 may be held in closed position during certain cycles.

*Comparing mechanism*

In the comparing mechanism the mechanical representations of master and detail card perforation patterns are mechanically compared and the occurrence of a comparison, or non-comparison, between such perforation patterns is utilized to control or vary machine operations. A knowledge of the specific construction of the comparing mechanism is not essential to an understanding of the present invention, but may be obtained from the above mentioned Patent 2,211,094. In so far as the present invention is concerned, it is sufficient to understand that the movement of the pins 105 in the master and detail card comparing pin assemblies 100 and 101, in accordance with the perforation patterns in master and detail cards, is effective to determine the position of certain comparing slides 102 (Fig. 1), one of which is provided for each column of a record card. Abutting each slide 102 is a manually settable interponent 103 which, when that column is to be used for comparing purposes, is set in its upper or effective position as shown in Fig. 1. The construction and arrangement of the comparing mechanism is such that in the event the compared perforation patterns are identical, the slides 102 are free to move to the left to permit counter-clockwise movement of a comparing slide sensing bail rod 104. However, if either pattern contains a perforation for which there is no counterpart in the other, one or more of the slides 102 are blocked and, together with its associated interponent 103, serves to prevent the counter-clockwise movement of bail rod 104.

*Control device*

As completely disclosed in the cited Patent 2,211,094 each of the mechanisms for effecting or varying machine functions such as card feeding, sorting, punching, and stopping the machine, as the result of the sensing of a comparison, or non-comparison, in the perforation patterns of master and detail cards, are actuated by individual control cams which may be rendered effective either singly or in combination, as desired, and are arranged for step-by-step operation by common actuating mechanism under control of the comparing mechanism. For convenience, the several control cams 270 and 367 (Figs. 2 and 3) and their associated mechanism and the manually settable means for selectively rendering the control cam actuating mechanism effective are referred to as the control device.

*Master and detail deflector mechanism*

For guiding master cards into the receiver pocket 27 or the eject pocket 26, a card deflector 250 (Figs. 1 and 3) is arranged between the master card pocket feed rolls and is fixed on a transverse rock shaft 251. This mechanism is shown in the Patent 2,496,124. Card deflector 250 is arranged to occupy either of two positions, namely, a horizontal or closed position in which it serves to guide master cards past eject pocket 26, or an inclined or open position in which it serves to deflect master cards into said eject pocket. Deflector 250 is normally urged to its horizontal position by a spring 252 extended between a frame stud and the forwardly extending arm of a bell-crank 253, fixed on shaft 251, whereby, in the absence of further control, all master cards are guided to receiver pocket 27, or to the interfiler pocket 25, depending on the setting of the interfiler control knob.

In order to control the position of the deflector 250 in accordance with the action of the comparing mechanism the forward arm of bell-crank 253 is provided with a stud 254 which positively engages a notch or shoulder 255 formed on a downwardly extending link 256. The latter is connected at its lower end to an arm 257 fast on a rock shaft 258 journaled in a suitable bracket on the frame of the machine. Fixed to the end of shaft 258 is a vertical arm 259 having a working face 261 that lies in the path of movement of a pin 262 fixed in the end of a horizontal link 263. The link 263 is connected to the pendant arm of a bell-crank 264 pivoted at 265 to a lever 266 pivotally mounted on the stud 267. The horizontal arm of the bell-crank 264 carries a roll 268 adapted to co-act with a card sorting cam 270 of the control device. The arrangement of this linkage is such that, when cam 270 is to be rendered effective, the control card sorting lever 266 is rocked clockwise, to elevate pivot 265 and move roller 268 into operative relationship with cam 270. Thus, when a non-comparison is sensed, a high dwell of cam 270 comes into register with roll 268. Bell-crank 264 is thereby rocked counter-clockwise and through link 263, pin 262, and arm 259 rocks shaft 258 clockwise, whereby link 256 is elevated to rock reflector 250 to open position, through the pin 254 and shoulder 255. In the event the succeeding master card contains a comparing perforation pattern the cam 270 rotates to place the low dwell of said cam in register with roller 268, whereby deflector 250 is restored to its horizontal closed position by spring 252 to guide the comparing master card past the eject pocket.

In order to segregate detail cards in a similar manner, a detail card deflector 272 is arranged between suitable detail card pocket feed rolls and is fixed to a transverse rock shaft 273, to which is fixed a bell-crank 274 having a pin in its pendant arm that extends into a slot in a horizontal link 275. Bell-crank 274 is urged counter-clockwise to urge deflector 272 to its inclined or open position by a spring 276 extended between the pin on the bell-crank and a pin on the link 275, but is retained in the position shown in Fig. 3 by a latch plate 277, pivoted at 278. The latch plate 277 is urged clockwise by a relatively light spring 279 and is provided at its lower end with a notched shoulder 281, arranged to engage a hook 282 on the forward arm of a bell-crank 283 which is pivoted at 284. The rear arm of bell-crank 283 is connected by a link 285, to the horizontal arm of the bell-crank 274. In order to control the position of deflector 272 in accordance with the action of the comparing mechanism, the latch plate 277 is provided with a roll 286, adapted to be engaged by hook portion 287 of a pawl 288 mounted for sliding movement on a settable link 290. A spring 292 heavier than spring 279 extended between a stud 293 on the link 290 and a stud 294 on pawl 288, serves to urge the hook portion 287 of pawl 288 against the roll 286, and rock the latch plate 277 counter-clockwise about its pivot 278. The link 290 is secured to a forwardly extending link 295, which link is connected at its forward end to an arm 296 fixed on a sleeve 297 mounted on the shaft 258. Also fixed to sleeve 297 is a vertical arm 298 having a working face 299 that lies in the path of movement of the pin 262. With this arrangement, when a non-comparison is sensed, cam 270 rocks bell-crank 264 counter-clockwise, and through elements 263, 262, 298, 297 serves to move links 295 and 290. Movement of the link 290 will cause the pawl 288 to move forwardly by the tension of spring 292. Thus, pawl 288 tends to rock latch plate 277 counter-clockwise to release the bell-cranks 283 and 274, and to permit the opening of deflector 272 by spring 276. In order to release deflector 272 at the proper time, the right end of link 275 is connected to an offset bell-crank 301 pivotally mounted on a shaft 302. Bell-crank 301 is urged counter-clockwise by a strong spring 303 whereby its follower roll 304 is urged against a cam 305 on the rear main cam shaft 140 which makes one revolution each machine cycle.

The machine is provided with a manually settable selective control for the deflector mechanism which is settable to either of a plurality of positions. For this purpose, a sorting control lever 246 is provided, the forward arm of which extends through a slot in the frame of the machine to be adjusted to either of three positions in suitable notches in an indicator plate 247 secured to the frame of the machine. The lever 246 is pivotally mounted on a stud 244 and is urged clockwise by means of a spring 243. Connected to the rearwardly connecting arm of lever 246 is a pendant link 245 which is connected at its lower end to link 263 by the pin 262. With this arrangement, lever 246 may be set in either an "L" position, a "U" position or a "B" position whereby pin 262 is correspondingly positioned relatively to the working faces 261 and 299 on arms 259 and 298, respectively, of the master and detail card deflector mechanism. Accordingly, when the lever 246 is set in its "L" position, the pin 262 is at its full low position so that it is in alignment only with the lower working face 261 on arm 259. When lever 246 is set in its "U" position, the pin 262 is at its intermediate position so that it is in alignment only with the working surface 299 on arm 298. When lever 246 is set in the "B" position shown, the pin 262 is at its full upper position so that it is in alignment with the upper working surface 261 and with surface 299 on the arms 259 and 298 respectively.

As explained fully in the Patent 2,496,124 when the lever 246 is set in its "L" position, only the detail card deflector 272 is controlled in accordance with the action of the comparing mechanism or sequence unit as will hereinafter be described, whereby the comparing detail cards are conveyed past detail card deflector 272 and the non-comparing detail cards are deflected to the detail card eject pocket 23.

When lever 246 is set in its "U" position, only the master card deflector 250 is controlled in accordance with the action of the comparing mechanism and sequence unit as will hereinafter be described, whereby the comparing master cards are conveyed past the master card deflector 250 and the non-comparing master cards are deflected to the master card eject pocket 26.

When lever 246 is set in its "B" position, both deflectors 250 and 272 are controlled by the comparing mechanism and sequence device as will hereinafter be described whereby comparing and non-comparing master cards as well as comparing and non-comparing detail cards are conveyed to or past their respective eject pockets.

*Sequence check mechanism*

As seen in Figs. 12–16, inclusive, the present embodiment of this feature of the invention is mounted on the right hand side frame 2. The operating mechanism of the sequence device is supported by side frames 110, suitably joined together by a series of cross bars 111, 115, 118, and 154 to form a box like supporting structure. At its upper ends the plates 110 are spaced apart by bars 111, each pair having mounted thereon a guide plate 112. The plates 112 are slotted to position a plurality of pins 114, there being two sets of these pins so as to compare the set-up of one card with the set-up of a preceding card or they may be adapted, as will hereinafter be explained so that one set of pins receives data from the master cards in the upper sensing chamber, and the other set of pins receives data from the detail cards in the lower sensing chamber. Mounted in slots formed in the cross bars 115 are plates 116 which act as guides and separate each row of pins 114 at their lower ends, there being six pins in each column corresponding to the 90 column code. For the purpose of this application fifteen columns of pins are used.

Figure 14:
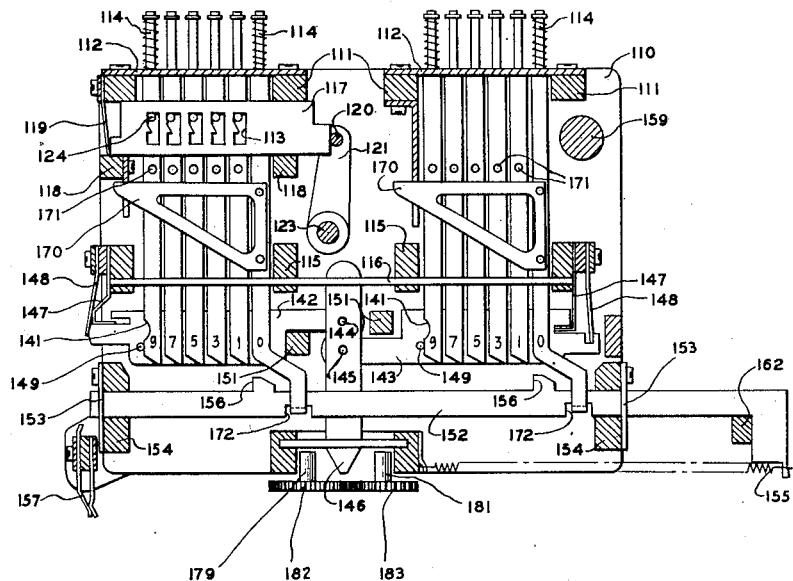
Fig. 14 is a cross section of the sequence unit showing the parts in normal or no signal position.
Figure 15:
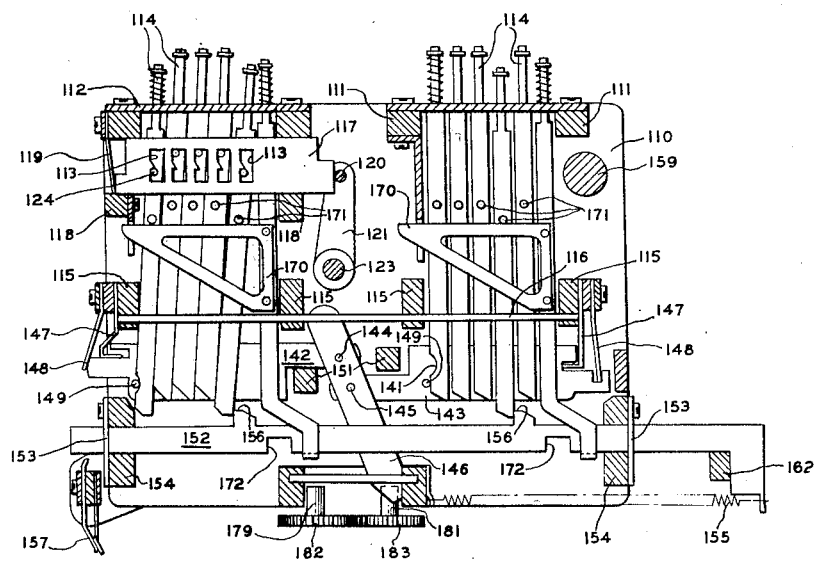
Fig. 15 is a cross section of the sequence unit showing a "high" signal obtained as the result of sensing a master or a following card.
Figure 16:
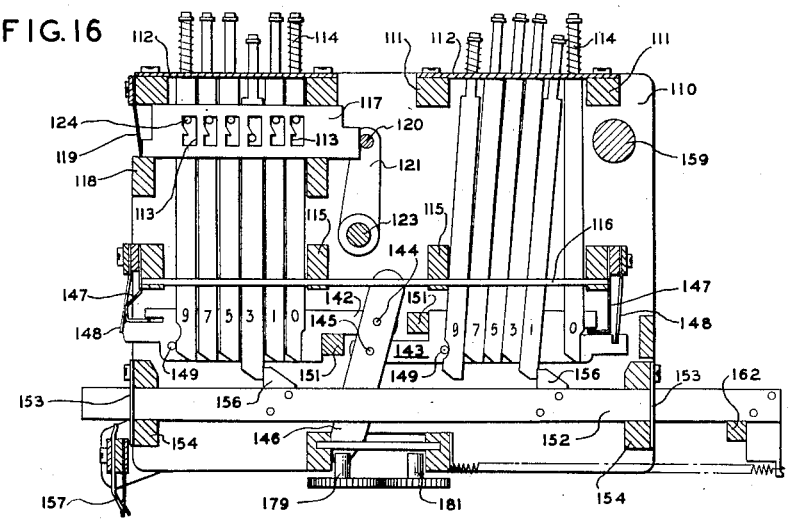
Fig. 16 is a cross section of the sequence unit showing a "high" signal obtained as the result of sensing a detail or a preceding card.

The pins 114 on the left hand side of Figs. 14, 15, and 16 are the pins utilized for holding the data of the lower or detail sensing or to hold a setting of the data of a preceding card, as the case may be. For this purpose a locking slide 117, slidably mounted between bars 111 and 118, and having locking windows 113 therein is provided for each column of pins.

The slides 117 are spring urged toward the right by a leaf spring comb 119, which coacts with the ends of the slides 117, which are adapted to be retracted by a bail 120 carried between a pair of arms 121 secured to a shaft 123. The depression of any pin 114 on the left hand side causes an extrusion 124 thereon to cam its associated locking slide 117 to the left against the action of spring 119 until said extrusion snaps beneath the nose on the locking window 113, at which time the slide 117 will return to the right due to spring 119, thereby locking the pin in its depressed position against the action of its spring.

Figure 5:
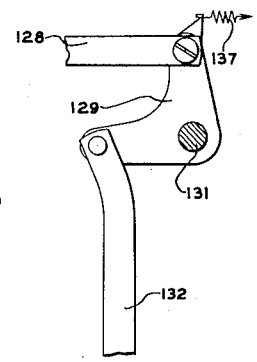
Fig. 5 is a similar view showing the operating mechanism for the sequence unit retract.

Referring to Figs. 5, 12, and 13 it will be seen that the shaft 123 is rocked once in each cycle to release any of the pins 114 through the following mechanism. Secured to the shaft 123 is an arm 125 which is connected to bell-crank 129 through the adjustable links 127, and 128, the bell-crank 129 being pivotally mounted on stud shaft 131. Suitably journaled to the other arm of said bell-crank is a link 132 which is secured at its lower end to an arm 133 pivoted at 135 on the side frame. The arm 133 has a follower roll 134 secured thereon which cooperates with the periphery of a retract cam 136 mounted on the rear main operating shaft 140. The arrangement is such that when the follower roll 134 rides on the low dwell of cam 136, spring 137 urges the locking slide 117 to the left against action of spring 119, allowing any extrusion 124 on a pin 114 to be released from under the nose in the window 113 of a slide 117.

Located between the lower ends of each column of pins 114 are plates 142 and 143 which are pivotally connected at 144 and 145, respectively, to a finger 146, and supported at their opposite ends in right angle brackets 147 secured to bars 115 and acting in slots on plates 142 and 143. The plates 142 and 143 are spring urged to the right by comb springs 148 and are provided with pins 149 adapted to cooperate with a cutout 141 on the "nine" pin 114. A pair of bars 151 mounted on the frames 110 form limit stops for the plates 142 and 143.

Cooperating with the lower ends of the pins 114 are a plurality of sensing slides 152, one being provided for each column of pins. The sensing slides 152 are slidably mounted in combs 153 carried by bars 154 and are urged toward the left by a spring 155. These slides are provided with stops 156 one for each group of pins 114 and adapted to cooperate with any pin 114 lowered into their path. Each one of the slides 152 is provided with individual lockout pins 157, so that any of the slides 152 can be rendered inoperative regardless of any sensing in that column.

Figure 17:
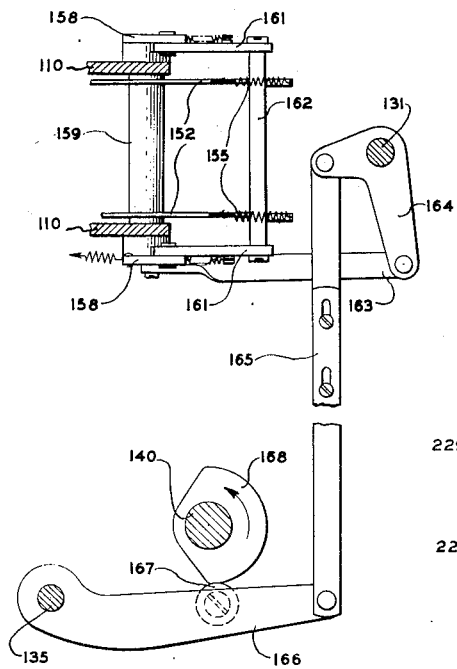
Fig. 17 is a detail view showing the operating mechanism for the sequence unit reading slides.

The slides 152 are actuated once in each cycle by the following mechanism. Two arms 158 (Figs. 12 and 17) secured to a cross shaft 159 are connected by links 161 to a bail 162 carried between the links 161. The bail is adapted to control the movement of the slides 152 due to the spring 155 holding the slides against said bail. Secured to one of the arms 158 is a link 163 which is journaled at its other end to one arm of a bell-crank 164 mounted on stud shaft 131. Journaled on the other arm of the bell-crank 164 is an adjustable link 165 pivoted at its lower end to an arm 166 which in turn is pivoted at 135 on the side frame 2. The arm 166 has a follower roller 167 secured thereon which cooperates with the periphery of a cam 168 mounted on the rear main operating shaft 140. As seen in Fig. 17, when the follower roll starts from normal position on the high dwell of cam 168 and travels to the low dwell it pushes up the link 165 which in turn rotates the bell-crank 164 clockwise about its pivot 131 so as to push the link 163 to the left in Fig. 17, thereby rocking the arm 158. When the arm 158 is rotated clockwise the bail 162 through links 161 is moved to the left permitting any of the slides 152 which have not been locked out by pins 157 to follow the bail 162 under action of their springs 155.

As seen in Figs. 14 and 15 another embodiment of this invention is the provision of an automatic zero so that a blank in either side of the sequence unit would not read as a high but as a true zero or low without necessitating the punching of zero in the columns preceding the first significant number. As can easily be understood, if the cards were not pre-punched with zeros, or if an automatic zero were not provided, a blank or no sensing in any particular column would permit the slides 152 to travel all the way to the left or until arrested by a sensing pin on the other side thereby giving a false or high signal.

For this purpose the zero pins 114 on both sides of the sequence unit are provided with a flag 170, the upper edge of which is adapted to cooperate with extrusions 171 on each of the other pins 114. Assuming that there is no sensing, the leg of the zero pin 114, lying in a slot 172 on the slide 152, stops said slide from following its bail 162 thus reading a low regardless of what sensing may be in the other side of the unit. As seen in Fig. 15 in the event that there is a sensing, the zero pin 114 is brought down by the extrusions 171 acting on the upper edge of the flag 170 and the leg of said zero pin is lowered beyond the slot 172 and said slide is permitted to move to the left.

Figure 14A:
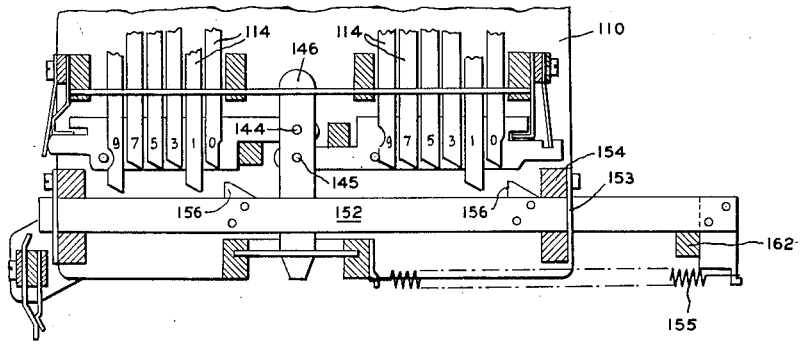
Fig. 14A is a sequence unit shown in cross section and illustrating the "1" and "2" sensings.
Figure 14B:
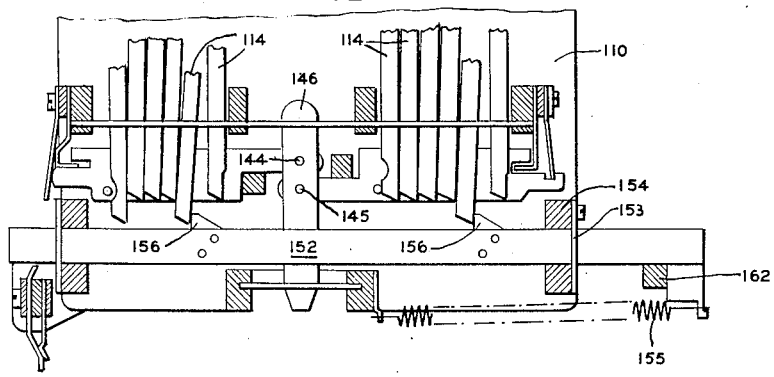
Fig. 14B is a view similar to Fig. 14 showing the pins thereof in bunched relation.
Figure 14C:
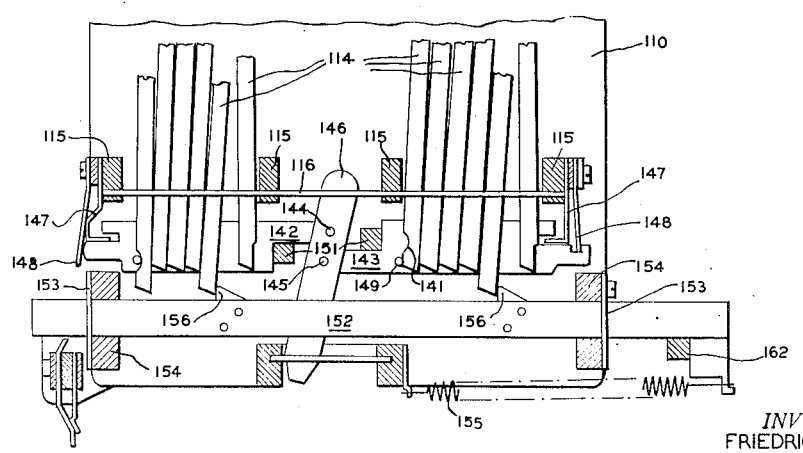
Fig. 14C is a view similar to Fig. 15 showing the parts in final position.

Each "nine" pin is provided with a recess 141 that is aligned with the pin 149 when the pin is in lowered position. This recess provides for a sufficient difference in relative movement between the slides 142 and 143 to throw the finger 146 to a high position. Assume for example that (Fig. 14A) the "one" and "nine" pins at the left are depressed and the "one" pin at the right is depressed to indicate respectively the numerals 2 and 1. When the slide 152 moves to the left it engages the "one" pins at both sides and bunches the adjacent pins but without disturbing the relative positions of the pivot points of the finger 146 (Fig. 14B). The pins at the right side, because pin "nine" is up, will move the slide 143 but the continued movement will not move slide 142 because notch 141 aligned with pin 149 allows the additional lateral movement of the pins 114 without moving the slide 142. The relative position of the pivot points of finger 146 have therefore changed to swing the finger to indicate a (Fig. 14C) "high" on the left side.

For the purpose of illustration let it be assumed that, in a detail or preceding card, a "two" represented by perforations in the one and nine positions have been sensed in the card to cause the lowering of the "one" and "nine" pins 114 in the left hand group of the sequence unit (Fig. 15), and that a "three" has been sensed in a master or following card, lowering the "three" pin 114 in the right hand group of the sequence unit. When the arms 158 rock clockwise (Figs. 12 and 17) through the cam 163 permitting the slide 152 to follow the bail 162 until the right hand stop 156 on the sensing slide 152 contacts the "one" pin 114 on the left hand side at approximately 353°, the entire assembly of pins 114 on the left hand side will move to the left a short distance until the lost motion due to a cut-out 141 in the "nine" pin picks up the pin 149 on the plate 142. Upon the continued movement of the slide 152, the left hand plate 142 is carried to the left (Fig. 15). The timing and amount of movement is such that the stop 156 on the right hand side has just contacted the "three" pin and the right hand plate 143 will remain stationary. The continued movement of the left hand plate 142 by the slide 152 will rock finger 146 about the pivot 145 in a counterclockwise direction into the path of a pin 181. As can be easily understood, in the event that a higher number was sensed in the left hand group, the finger 146 moved by slide 143 would rock about the pivot 144 in a clockwise direction into the path of a pin 179 in the assembly now to be described.

*Cross reading mechanism*

Figure 4:
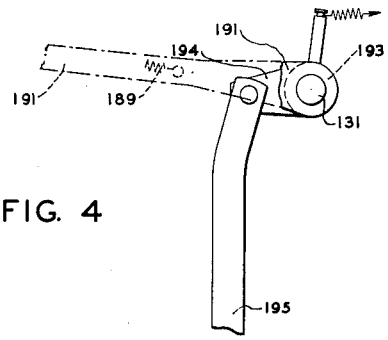
Fig. 4 is a detail view showing the operating means for the cross reading mechanism.

Slidably mounted on two vertical rods 175 (Figs. 7 to 11, inclusive) is a member 176 on which a plate 177 is pivoted at 178. Carried on pins 179 and 181 secured in plate 177 is a pair of meshing gears 182 and 183. A pin 184 in member 176 acts in an arcuate slot 186 in the plate 177 to limit the rocking movement of the plate. The gear 183 meshes with a stationary rack 187 and the gear 182 meshes with a movable rack 188. The member 176 is resiliently secured by a spring 189 to the free end of a lever 191 rocked once in each cycle by a cam 192 on the shaft 140 (Fig. 4), said lever 191 being secured to a collar 193 loosely mounted on the stud shaft 131. An arm 194 secured to the other side of said collar 193 through a link 195 pivoted at its lower end to an arm 196 is actuated by a cam 192 through a roll 197.

At approximately 30° after the fingers 146 of the different columns, representing the numeral to be checked, have been positioned through the hereinabove described mechanism, the roll 197 riding on the high dwell of cam 192 rocks the lever 191 downward carrying the member 176 with it through its spring 189 so that it may scan the fingers 146, to sense the first one of said fingers that may have been positioned by the slides 152.

When a finger 146 has been positioned in the path of stud 179 (Figs. 8 and 16) and the member 176 starts its downward movement on the rods 175 at approximately 30°, the gear 183 rolls on the fixed rack 187 in a clockwise direction thus rolling the gear 182 in a counterclockwise direction and retaining rack 188 stationary. When the stud 179 reaches the finger 146, the downward travel of the stud is halted. The continued movement of member 176 under influence of arm 191 causes plate 177 on which the gears 182 and 183 are mounted to rock counterclockwise about its pivot 178 until limited by pin 184 in slot 186. This rocking motion, since gear 183 is rolling in a clockwise direction, causes gear 182 to roll in a counter-clockwise direction and since the stud 179 is held by finger 146 there is no further downward movement of the gear 182. The rack 188 is, therefore, moved upward by the gear 182 transmitting a signal for controlling certain functions of the machine through mechanism which will be hereinafter described. If, however, the finger 146 was positioned in the path of stud 181 to the left in Fig. 9 there would be no further downward movement of the gear 183 causing the gear 182 to roll about it in a clockwise direction drawing rack 188 down to give a different signal for controlling said functions of the machine.

The mechanism for receiving the signal from the rack 188 (Figs. 2, 12 and 13) comprises an arm 309 secured on the forward end of a shaft 310, the forked end 311 of which arm engages an extrusion 312 on the rack 188. Fixed on the rearward end of the shaft 310 is an arm 313 having secured at its upper end a link 314. The other end of link 314 is secured to the upper end of a T-shaped link 315 which has a link 316 journaled at its lower end. The link 316, guided by stud 317 is adapted to be reciprocated once in each machine cycle by a cam 318 fast on the front main operating shaft 60 through a follower roller 319 secured to an arm 320, pivoted at one end to a stud 321 on the side frame and fastened at its other end to the link 316.

A sequence feeding control member 323 having a button 324 secured thereon is slidably mounted in a collar on the link 315 and is adapted to be rotated 180° to either of two positions, the position shown in Fig. 2, where it is held by a pin 322 in a hole in one arm of the T-shaped link 315 and is used for double deck sequence operation, or the position shown in Fig. 13, where it is held by the pin 322 in a hole on the other arm of the T-shaped link 315 and is used for single deck sequence check operation. In the position shown in Fig. 2 two legs 307 and 308 on the member 323 are adapted to cooperate with studs 325 and 326 respectively on a bell-crank 327 pivoted on a stud shaft 328. In the position shown in Fig. 13 the third leg 338 of the member 323 is adapted to cooperate with the stud 325 while a pin 309 on said leg is adapted to cooperate with a shoulder 291 on a link 289 mounted on a stud 333 at its lower end and guided for movement at its upper end by stud shaft 328. Mounted on the stud 326 are two links 329 and 330. The rearmost link 330 is journaled at its lower end to an arm 331 fast on a shaft 332. The other link 329, having a slot at its lower end, is journaled on stud 333 at one side and is loose on a shaft 335. The link 329 may be adapted to rock said shaft 335 by allowing a sequence segregation control plunger 336 mounted on an arm 337 fixed to the shaft 335 to be pushed manually into a suitable hole on the arm 334. The plunger is pushed in for operation of shaft 335 and retracted for non-operation of said shaft.

When this control is set in its operative position, the sequence control unit is connected directly to the card receiving and interfiling mechanisms (Fig. 3). Card receiving and card interfiling functions in single deck operations are controlled by the equal (match) and low order (non-match) signals from the sequence control unit according to the setting of the segregation control and the interfiling control dial.

For two file operation, the general run of applications requiring segregation are performed through the use of the control device of the comparing unit and, therefore, the plunger 336 is set in its out or inoperative position.

Mounted on the stud 325 is a link 340 journaled at its lower end to the stud 333 on the arm 334. Slidably mounted on the link 340 is a plate 341 having a pin 342 secured thereon and adapted to be engaged by a tail 343 on the member 323 when it is rotated from its Fig. 2 position to be used for a single deck sequence check as shown in Fig. 13. The plate 341 and link 340 may be moved in unison to rock shaft 335 or can be manually disengaged from one another by a single file segregation control plunger 344 on plate 341 so that the plate 341 rides idly on the link 340 and no movement is transmitted to the shaft 335. The plate 341 and the link 289 are effective in single deck operations when the sequence control member 323 is set in its single deck control position as shown in Fig. 13. The link 289 is actuated as a result of an equal sequence condition between two successive cards and the plate 341 is actuated as a result of an out of sequence condition between successive cards.

The plunger 344 has two positions. In single file operation, for example when it is pushed in (Fig. 21) segregation of all out-of-sequence cards occurs together with all equal cards except the first card of equal (matched) card groups. When the plunger 344 is pulled out (Fig. 22) segregation of the first card of each equal (matched) card groups occurs. The out of sequence cards will not be segregated.

The segregation control shaft 335 is adapted to control the deflector mechanism, hereinbefore described, by the following mechanism. The shaft 335 is connected to a shaft 378 by an arm 379 having a forked end engaging a pin 381 on an arm 382 secured to the shaft 378. Secured on the end of shaft 378 is an arm 383 connected to bell-crank 264 and actuating arm 263 by a link 384. As can be readily understood rocking of shaft 335 through the sequence mechanism has the same effect as if the bell-crank 264, through cam 270, was rocked to open the eject pockets.

*Card feed and card stop control mechanism*

As heretofore explained, the master and detail card feeding mechanisms are each normally arranged to feed cards during each machine cycle but either may be prevented from operating if the associated disabling latch 65 or 66 is rendered effective (Figs. 2 and 2A). The latches 66, 65 are actuated through the link 62 which has three effective control positions which are determined jointly by the control device of the comparing unit acting through the rock shaft 371 and the sequencing device acting through the rock shaft 332. The rock shaft 371 corresponds to the shaft 650 in the aforementioned patent to Braun 2,211,094, and, as more fully explained in said patent, may be actuated by any one of a variety of feed control cams in the control device of the comparing unit in order to achieve various types of feeding operations. In the present machine the feed control cams of the control device of the comparing unit, not shown, but mounted adjacent to and on the same shaft as the control cams 270 and 367 are so arranged as to maintain the control shaft 371 in a control position corresponding to the sequence control feeding operation which may be selected and regardless of the match or non-match condition of the comparing unit. For example, when feeding operation #1 is selected the feed control cams thereby brought into operation are effective for maintaining the shaft 371 in its intermediate control position regardless of match or non-match conditions in the comparing unit. When feeding operation #2 is selected the shaft 371 is maintained in its counter-clockwise rocked control position regardless of match or non-match condition in the comparing unit. When feeding operation #3 is selected the feed control cams of the control device are effective for maintaining the shaft 371 in its most clockwise rocked control position regardless of match or non-match condition in the comparing unit. For feeding operation #1 a pair of feed control cams (each corresponding to feed control cam 720 of said patent to Braun 2,211,094) are rendered effective, the cams of said pair being relatively offset to each other so as to maintain the control shaft 371 in its intermediate control position for both match and non-match condition of the comparing unit. For feeding operation #3 a pair of cams (each corresponding to feed control cam 750 of said patent to Braun) are rendered effective, said cams also being relatively offset to each other so as to maintain the control shaft 371 in its most clockwise control position for both match and non-match conditions of the comparing unit. For feeding operation #2 neither of said feed control cams are rendered effective with the result that the control shaft 371 is maintained in its most counterclockwise rocked control position for both match and non-match condition of the comparing unit. The shaft 371 is effective for yieldably maintaining the card feed control link 62 in one of its corresponding three control positions by means of a rock arm 373 fast on the shaft 371. The arm 373 carries a stud 374 which is disposed closely adjacent a stud 375 carried by the feed control link 62. The rocking of arm 373 yieldably positions the link 62 by means of a yielding centering mechanism comprised of an arm 369 loosely mounted on shaft 371 and an arm 368 which constitutes the forward extension of the detail card stop hook lever 94 which is also loosely mounted on shaft 371. The arms 369 and 368 are tensioned together by a spring 372 so as to yieldably engage the two studs 374 and 375.

The position of the card feed link 62, in addition to determining the control setting of the master and detail card feed disabling hooks 66 and 65 respectively, as heretofore described, also determines the effective position of the hook lever 94 so as to selectively control the operation of the card stops associated with the respective master and detail card sensing mechanism in accordance with which feed mechanism is permitted to operate. As can be best seen in Fig. 2A, the actuating link 106 for the card stop associated with the master card sensing mechanism is provided with a stud 359 which is disposed for engagement by the hook arm of a bell crank 357 pivotally mounted on a frame bracket 358. The bell crank 357, when rocked counter-clockwise from position shown in Fig. 2A, engages the stud 359 so as to thereby hold the card stops for the master card sensing chamber in closed position. Said bell crank 357 is operatively associated by a yieldable pin and slot connection with a link 376 which is pivotally connected to the hook lever 94. In Fig. 2A the feed control link 62 is shown in its intermediate control position for enabling feed of card from both the master and detail magazine. Accordingly the hook lever 94 is likewise maintained in its intermediate position disengaged from stud 93 to permit opening of the detail card stops, the bell crank 357 also being held by link 376 in its intermediate position disengaged from said 359 so as to permit the opening of the master card stops. In the event the feed control link 62 is raised to its uppermost control position either by operation of the control shaft 371 resulting from selection of feeding operation #3 or by operation of the sequencing device in a manner hereinafter more fully described, the hook lever 94 and bell crank 357 will be rocked clockwise, the lever 94 engaging stud 93 so as to prevent the opening of the detail card stops. In the event the card feed link 62 is lowered to prevent the feed of cards from the master card magazine, the hook lever 94 will be rocked counter-clockwise from the position shown in 2A so as to cause the bell crank 357, except when under control of the upper card holding control lever in a manner hereinafter more fully described, to engage the stud 359 and thereby prevent the opening of the card stops associated with the master card sensing chamber. The feed control link 62 is selectively positioned by the sequencing device operating through the feed control shaft 332 which, heretofore described, rocks in one or another direction in accordance with unequal sequence relationships determined by the sequencing device. A rock arm 352 fast on the shaft 332 carries a pin 353 which is yieldably engaged by the two opposed arms 349 of a centering mechanism tensioned towards each other by a spring 351, said arms 349 being loosely mounted on the shaft 332. An actuating arm 348 also loosely mounted on the shaft 332 carries a pin 354 which is also yieldably engaged by the arms 349 of the centering device. Said arm 348 also has a pin 346 which bears in a slot formed in the upper extremity of the feed control link 62. As heretofore mentioned, the sequencing device, upon determining unequal sequence relationship between the compared master and detail cards, operates to rock the feed control shaft 332 in a clockwise direction as viewed in Fig. 2A when the detail card is of the higher order, and rocks the shaft 332 in a counter-clockwise direction when the master card is of the higher order. When the compared master and detail cards are equal there is no movement imparted to the shaft 332. The extent of the rocking movement of the arm 348 resulting from unequal sequence relationships is substantially equivalent to the length of the slot 347.

Figs. 2 and 2A show the relative position of the parts when conditioned for feeding operation #1 and with an equal sequence condition in the sequencing device. It will be noted that the feed control link 62 is in its intermediate control position and that the pin 346 on the actuating arm 348 is disposed substantially in the center of the slot 347. Accordingly under these conditions, both master and detail cards will feed from their respective magazines and the card stop associated with both sensing mechanisms will open as a result of the equal condition in the sequencing device. In the event of a condition of unequality in the sequencing device with the detail card being of lower order, the counter-clockwise rocking of the actuating arm 348 will lower the feed control link 62 to its lowermost control position wherein the master card feed disabling hook 66 becomes effective and wherein at the same time the card stop hook lever 94 is rocked counter-clockwise rendering bell crank 357 effective for preventing the opening of the card stops associated with the master card sensing mechanism. In the event the sequencing device determines the master card to be of lower order, the clockwise rocking of the actuating arm 348 raises the feed control link 62 from the position shown to its uppermost control position wherein the detail card feed disabling hook 65 becomes effective and wherein at the same time the hook lever 94 is rocked clockwise to engage pin 93 and thereby prevent opening of the card stops associated with the detail sensing mechanism.

In feeding operation #2 the comparing unit control device operating through control shaft 371 conditions the link 62 to assume its lowermost control position, in which position the pin 346 will be located at the top of the slot 347 when the sequencing device determines condition of equality. Accordingly, in feeding operation #2 only the lower or detail card will feed as the result of equality between the compared master and detail cards. In the event the sequence device determines the detail card to be of low order the resulting counter-clockwise rocking of the feed control shaft 332 causes only idle movement of the pin 346 in slot 347. In the event the master cards were found to be of lower order the clockwise rocking of the feed control shaft 332 operating through pin 346 will raise the link 62 to its uppermost control position so as to disable the feed of detail cards and to prevent the opening of the card stops associated with the detail card sensing mechanism.

In feeding operation #3 the feed control cams of the comparing unit control device operating through the shaft 371 condition the feed control link 62 to assume its uppermost control position wherein the pin 346 will bear in the bottom of slot 347 upon the occurrence of equal sequence relationship determined by the sequencing device. Accordingly, the feeding operation #3 only master cards will feed as the result of equality between the sequentially compared master and detail cards. In the event the master cards was found to be of lower order, the clockwise rocking of feed control shaft 332 causes only an idle movement of the pin 346 in the slot 347. In the event the detail cards was found to be of lower order the counter-clockwise rocking of the feed control shaft 332 operating through pin 346 will lower the feed control link 62 to its lowermost control position so as to prevent the feed of master cards and also prevent the opening of the card stop associated with the master card sensing mechanism.

From the foregoing it will be apparent that the combined or joint control of the feed control link by the control shafts 371 and 332 operate to achieve low order feeding from the respective master and detail card magazines for whichever feeding operation may be selected. The distinction in function between the above mentioned three sequence controlled card feeding operations concerns the handling or control exercised over the respective feed mechanisms upon the occurrence of equality between the compared master detail cards. In feeding operation #1 both master and detail card feeding mechanisms operate as the result of equality between the compared cards. In feeding operation #2 only the detail card feed mechanism operates as the result of equality between the compared cards. In feeding operation #3 only the master card feeding mechanism operates as the result of equality between the compared cards.

The machine is provided with an upper card holding control means 385 which may be manually set in either of two positions, viz., 1. Up—effective. A card fed into the upper sensing section 20 will be held in that section until the next actuation of the upper card feeding means upon the sensing of an equal (match) or low order (non-match) according to the selective card feeding operation being used at the time.

2. Down—ineffective. A card fed into the upper sensing section will be ejected. The set-up made from the sensing of that card, however, is held in this sensing section 20 until the upper card feeding means is again actuated.

The upper card holding control mechanism, as seen in Figs. 1 and 2, comprises a lever 385, the handle of which protrudes through a slot in the frame of the machine, and is fixed to a collar pivotally mounted on a stud 386 in a frame 387. Also fixed to said collar is an arm 388 which is adapted to cooperate with a pin 389 on the link 356. The link 356 pivotally connects the bell crank 357 with the upright arm of a bell crank 355 loosely carried on the feed control shaft 332 and when pushed rearwardly to the position shown in Fig. 2A holds the bell crank 357 disengaged from stud 359 regardless of the control position of the feed control link 62 and hook lever 94. In the up or effective position of the lever 385 the arm 388 is moved away from the pin 389 and has no effect on the link 356 or upper card stop hook 357 and, therefore, the upper card stop may hold the card in the sensing chamber under control of the sequence unit. This control must be set in its upper effective position for the double deck sequence control operation.

In the down or ineffective position of the lever 385 (Fig. 2) the arm 388, through pin 389, pushes the link 356 to rock the bell-crank 357 away from the pin 359 on the upper card stop control link 106. Thus, all cards fed into the upper sensing section will be ejected and the uninterrupted feed required for the single file operation maintained.

In certain types of two file operation it is desired to be able to control the card stops associated with the master card sensing mechanism independently of the master card feeding mechanism so as to release a master card from the sensing chamber for interfiling with detail cards even though the master card feed mechanism may be disabled. To achieve this function a link 361 having a pin and slot connection with bell crank 355 is pivotally joined at its lower extremity to a rock arm 362 fast on a rock shaft 363, said rock shaft being suitably journalled in the frame of the machine. The shaft 363 at its opposite end carries a rock arm 364 which is pivotally joined by a link 365 to a cam follower 366 supported similarly to follower 264 for selective cooperation with a card release control cam 367 provided in the control device of the comparing unit. A high dwell of said card release control cam 367 operates through follower 366 shaft 363 and bell crank 365 to move the link 356 rearwardly and thereby disengage the bell crank 357 from the pin 359. The cam 367 is rotated in the usual manner as a result of match or non-match conditions in the comparing unit and may be employed, for example in feeding operation #2, to release a matching master card from the master card sensing chamber. In feeding operation #2, as heretofore mentioned, the master card feed mechanism is disabled as the result of equality between the compared master and detail cards. With the cam 367 so mounted as to render a high dwell thereof effective as the result of a match condition in the comparing unit. It will be seen that the cam will be effective to release a matching master card from the master card sensing chamber while still permitting the holding of high order non-matching master cards within the master card sensing chamber. It will be apparent that this independent control of the upper or master card stop through operation of cam 367, so as to enable the release of a card from the master card chamber when the master card feeding mechanism is disabled, may be achieved regardless of whether master and detail card feed is controlled solely by the comparing unit as in the machine of the patents hereinabove referred to or is controlled by the sequence unit as herein described.

It will be noted at the end of a sequence control run, that the last card of a file will be held in either the upper or the lower sensing section, depending upon the operation. This card will not feed out because the opposing sensing section is empty and the zeros are set up in the related section of the sequence control unit.

Therefore, a last card release button 391 (Figs. 1 and 2) is provided to give an optional simultaneous feeding from both upper and lower feeding means. The button 391 is slidably mounted on the frame 387 and is provided with a forked end 392 adapted to engage a stud 393 on the card feed link 62. Thus, if the card feed link 62 is in either its upper or lower position the forked end 392 acts as a centering device for the link 62, thereby feeding both magazines together and clearing the machine regardless of whether or not the last card was in the upper or lower sensing sections.

*Single deck wiring unit*

Figure 18:
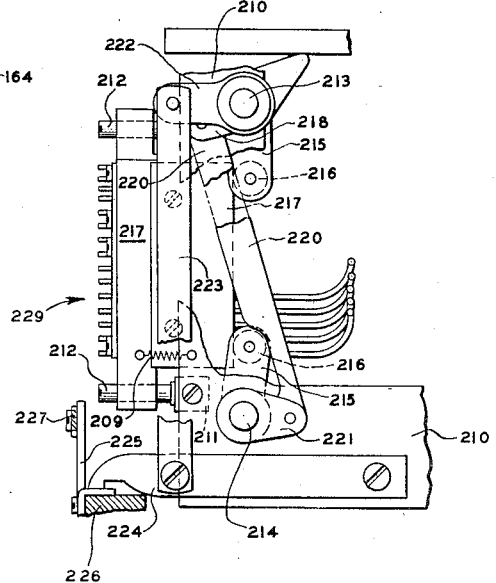
Fig. 18 is a detail view of the signal deck reciprocating pin box wiring unit.
Figure 19:
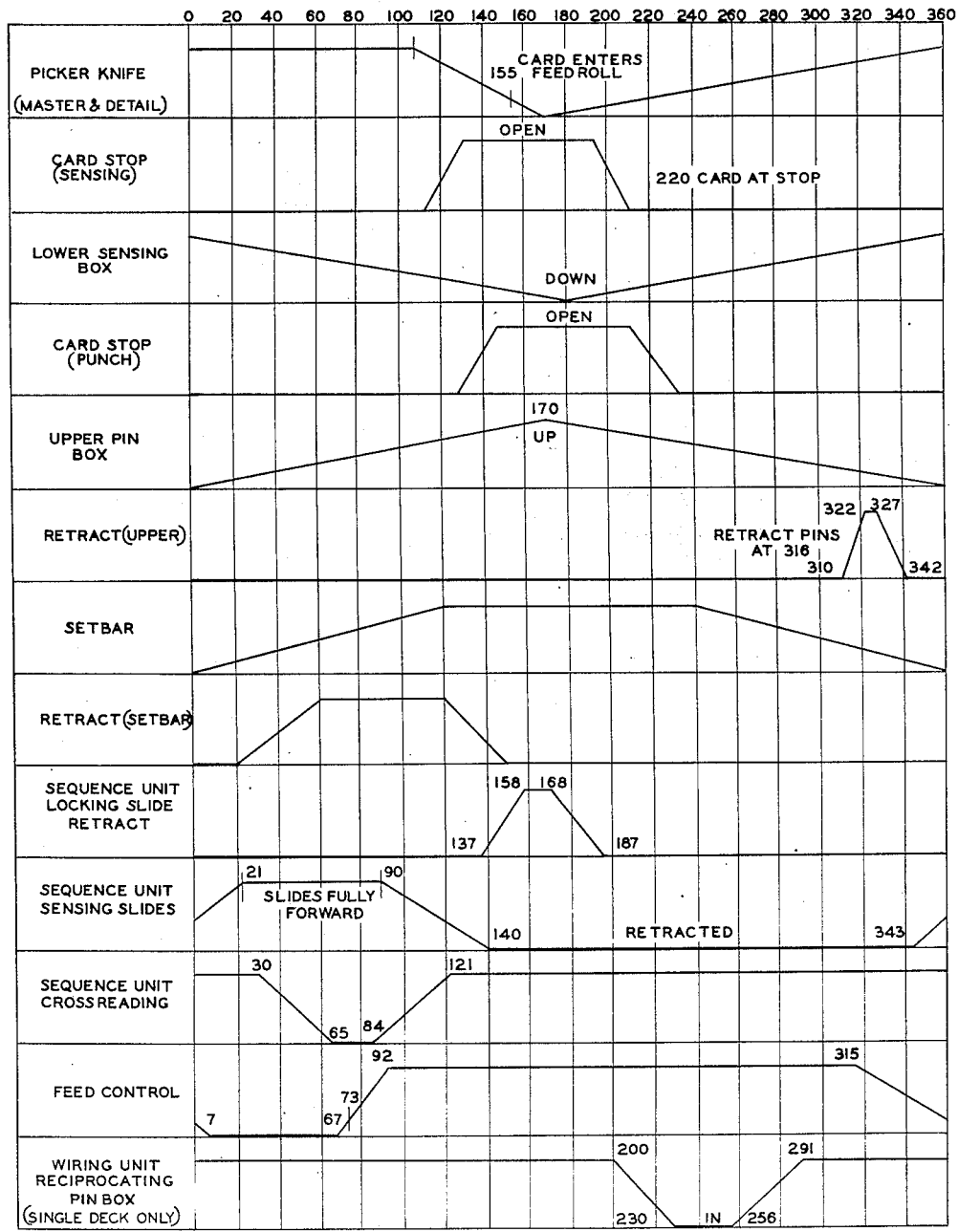
Fig. 19 is a timing diagram of the main operating mechanisms of the machine.

It will be understood that in the single deck sequence check operation the sensing of the preceding card must be retained in order to compare it with the sensing of the following card. To accomplish this a special wiring unit is provided as seen in Figs. 12 and 18. Mounted on a pair of frame members 210 are two cross bars 211, said bars having studs 212 therein. A reciprocating pin box 229 of the usual construction is slidably mounted on the studs 212 and spring urged against the bars 211 by springs 209 and 219. Journaled in the frames 210 are two shafts 213 and 214, each of said shafts having a pair of arms 215 fast thereon. The arms 215 have rolls 216 which are adapted to cooperate with the edges of plates 217 mounted on the reciprocating pin box. Secured on the shaft 213 is an arm 218 which supports the upper end of a link 220. At its lower end the link 220 is journaled on an arm 221 fast on the shaft 214. Also mounted on the shaft 213 is an arm 222 which has the upper end of a link 223 connected thereto. The lower end of the link 223 is connected to a lever 224 pivoted at its rearward end to the frame 210, the forward end of the lever 224 being adapted to cooperate with a lip on one end of a bell-crank 225 (Fig. 13) pivoted on a cross bar 226.

Mounted on the other arm of the bell-crank 225 is one end of a link 227, the other end of said link being connected to an arm 228 secured to a shaft 230 journaled at its opposite ends in the bracket 231 and in the cross bar 226. Secured on the shaft 230 is an arm 232 which has the upper end of a link 233 journaled thereon. The lower end of the link 233 is secured to an arm 234, pivoted at 135 on the side frame 2. The arm 234 has a follower roll 235 secured thereon which cooperates with the periphery of a cam 236 mounted on the shaft 140.

As illustrated in the timing and single deck sequence charts (Figs. 19 to 22, inclusive), the above described reciprocating pin box allows the sensing of the preceding card to be compared against the sensing of the card in the machine in the following manner:

The first card "1" of the single file is fed in and sensed at 350° and the sensing entered into the reciprocating pin box 229 and into the right hand side of the sequence unit at the same time. At 240° of the following cycle the reciprocating pin box is actuated and the sensing locked in the left hand side of the sequence unit by slide 117. Later in this cycle (325°), the sensing of the card "1" is retracted from the right hand side of the unit by the upper sensing retract mechanism. The following card "2" which was fed at 120° of the second cycle is sensed at 350° and the sensing delivered to the now empty reciprocating pin box 229 and to the right hand side of the sequence unit. As can readily be understood, in the following cycle the sensing slides 152 give a signal at 21°, thereby reading the preceding card against the card in the machine.

The charts shown in Figs. 23 to 27, inclusive, illustrate schematically the manner in which master and detail cards are passed through the machine under control of the sequence device. It will, of course, be understood that in the illustrated examples, the sequence unit is wired to receive the same sensed data as the comparing unit so as to achieve low order feeding of the respective master and detail cards when non-matching conditions occur and are determined by the comparing unit. This low order feed control is the principal function of the sequence unit in two file operations wherein the comparing unit is also employed for controlling the segregating functions of the machine. A stack of master cards are placed in the master card magazine 18 and a stack of detail cards are placed in the detail card magazine 10. For this operation the member 323 is placed in the position shown in Fig. 2 and the buttons 336 and 344 are rendered ineffective and segregation on the "two file operation" is done through the comparing unit. At the same time lever 385 in effective position allows the master card stop 96 to hold a master card in the sensing chamber whenever the master card feeding mechanism is non-operative. When the machine is started a master card and a detail card are fed simultaneously at approximately 120° and are compared in the sequence unit at approximately 20° of the next cycle to determine which card is high so that the card having the lowest value may be fed out of the machine (Fig. 23) the master and detail cards that are in sequence being accumulated in pocket 25. In the event that the cards are equal, since feeding operation #1 is employed both are fed. As shown in Figs. 24 and 26, either a matching detail or a matching master card may be fed to its respective pocket 23 or 26, depending upon the position of lever 246 and when the control device of the comparing unit is conditioned for segregation on a matching relationship. Non-matching cards in the magazines 10 and 18 in the operation diagrammed in Figs. 25 and 27 may be filed in their respective magazines 23 and 26 when the control device of the comparing unit is conditioned for segregation on a non-matching relationship.

When the rack 188 is moved down at approximately 60° by a high signal in the right hand side of the sequence unit, which is the side holding the master card sensing, the member 323 is moved to the right (Fig. 2). In this case it is, therefore, necessary to hold the upper card stop 96 closed, thus holding the high card in the sensing chamber 20, and at the same time stop the upper card feed to prevent a possible jam. In doing this the low card in the bottom or detail card sensing chamber 12 is permitted to feed out of the machine first, thus arriving at a proper file. The movement of member 323 to the right at 60°, positions the leg 307 of said member over the stud 325. Thereby, when the member 323 is moved down at approximately 92°, through cam 318 and its associated links 316 and 315, it rocks bell-crank 327 counter-clockwise, raising the link 330 up, through stud 326, and thereby rocking the shaft 332 counter-clockwise. The rocking of shaft 332 counter-clockwise causes the hook 357, through link 376, to move over the stud 359 on the upper card stop link 106, at approximately 92° thus preventing the card stop 96 from opening at 130°. The hook lever 94 is moved away from stud 93 of the lower card stop mechanism by the link 62.

At the same time the card stop link 62 being moved down through its associated centering device, thereby positions the upper card feed hook 66 over the stud 70 at approximately 92° to stop the upper card picker knife 30 from operating at 108°.

Assuming the rack 188 is moved up at approximately 60° by a high signal in the left hand side of the sequence unit, which is the side holding the detail card sensing, the member 323 is moved to the left (Figs. 2 and 2A). In this case it is, therefore, necessary to hold the lower card stop 77 closed, thus holding the card in the sensing chamber 12, and at the same time holding the lower card feed inoperative to prevent a possible jam. In doing this the card with the lowest value in the upper or master card sensing chamber 20 is permitted to feed out of the machine first, thus arriving at a proper file.

The movement of said member 323 to the left, positions the leg 308 of said member over the stud 326. Thus, when the member 323 is moved down at approximately 92° through cam 318, it rocks bell-crank 327 clockwise, lowering the link 330 through stud 326, thereby rocking the shaft 332 clockwise. The rocking of shaft 332 clockwise causes the hook 357, through link 376, to move away from stud 359 thus allowing the upper card stop 96 to open at approximately 130°. At the same time the card stop link 62 being moved up through its associated centering device, thereby positions the lower card feed hook 65 to engage the stud 70 at approximately 92° to stop the lower card picker knife 34 from operating at approximately 108°. The upward movement of link 62 at 92° rocks the hook arm 94 clockwise about its pivot 371 through the stud 375 on link 62 and its associated centering device. The clockwise rotation of arm 94 positions the hook portion thereon over the stud 93 on the lower card stop operating arm 92, thus preventing the lower card stop 77 from opening at approximately 130°.

The charts shown in Figs. 20 to 22, inclusive, are included herewith to illustrate schematically the manner in which a single file of cards is passed through the machine under control of the sequence device. A stack of pre-sorted cards in the master card feed magazine are fed continuously each operating cycle, and a stack of blank or signal cards in the detail card magazine as will hereinafter be described, are fed only when an out of sequence condition arises. For this operation, the member 323 is placed in the position shown in Fig. 13 and the buttons 336 and 344 may be rendered effective if it is desirable to segregate out of sequence cards together with all equal cards except first cards of equal groups, or to segregate only equal cards except the first of a group. As hereinbefore described, with reference to the reciprocating pin box 229 the preceding card is compared against the following card. Assuming the rack 188 is moved down at approximately 60° by a high signal in the right hand side of the sequence unit, which is the side holding the following card sensing, the member 323 is moved to the right (Fig. 13) this being a proper sequence signal and the movement of member 323 down, by its cam 318, has no effect on the card feed mechanism. However, if the rack 188 is moved up at 60° by a high out of sequence signal in the left hand side of the sequence unit, which is the side holding the preceding card sensing due to the action of the reciprocating pin box 229, the member 323 is moved to the left from the position shown (Fig. 13). In this case, it is necessary to release the lower card feed to permit a signal card to feed, thereby arriving at the file shown in Fig. 20. The movement of the member 323 to the left positions the leg 338 over the stud 325 and the tail 343 is positioned over the stud 342. Thus, when the member 323 is moved down at approximately 92°, through cam 318, the leg 338 is so made that it gives the bell-crank 327 a half motion counter-clockwise through stud 325. This motion, raises the link 330 (Fig. 2) and since feeding operation #3 is employed for single file sequence checking operation, rocks the card feed control shaft 332 counter-clockwise to its intermediate control position to remove the lower card feed hook 65 from its stud 70 and thereby feed a signal card on the out of sequence signal. Due also to the half motion of bell-crank 327 the upper card feed hook 66 is not moved over its pin 70, thereby maintaining an uninterrupted card feed.

If it is required that the out of sequence cards be segregated and the button 344 is made effective, the downward movement of the member 323 rocks the segregation control shaft 335 clockwise, through link 340, which in turn rocks the shaft 378 counter-clockwise to actuate the deflector mechanism through the links 384 and 263, thus segregating the out of sequence cards.

Assuming the preceding card and the following cards are equal and there is no movement of the rack 188, then if it is required that the equal cards be segregated and the button 336 is made effective the downward movement of the member 323 pushes link 289 down, through the pin 300, acting on shoulder 291 of the link 289. The downward movement of link 289 has the same effect on the deflector mechanism as the downward movement of link 340, thus the equal card is segregated. It will be noted, however, that the first card of equal groups cannot be segregated due to the fact that the preceding card has already left the machine and only the sensing thereof remains locked in the left hand side of the sequence unit. All of the out of sequence cards may be segregated, however, because the out of sequence arises only when the value of the following card is lower than the preceding card and is, therefore, still in the machine.

While we have described what we consider to be highly desirable embodiments of our invention, it is obvious that many changes in form could be made without departing from the spirit of our invention, and we, therefore, do not limit ourselves to the exact form herein shown and described, nor to anything less than the whole of our invention as hereinbefore set forth, and as hereinafter claimed.

What we claim as new, and desire to secure by Letters Patent, is:

1. In a machine of the class described, means for individually sensing master and detail cards, a sequence unit for setting up the result of said sensings, reading means for detecting a difference in the values of said set-ups including a movable and a stationary rack, a member adapted to travel the length of said racks, a pair of gears pivotally mounted on said member, sensing means axially mounted on said gears for sensing said set-ups, card supply magazines for said master and detail cards, means for feeding said master and detail cards from said magazines to said card sensing means, and means controlled by said reading means for varying the operation of said card feeding means.

2. In a machine of the class described, means for individually sensing master and detail cards, a sequence unit for setting up the result of said sensings including two sets of pins one of said sets for receiving data from the master card, and the other set for receiving data from the detail card, reading means for detecting a difference in the values of said set-ups including a movable and a stationary rack, a member adapted to travel the length of said racks, a pair of gears pivotally mounted on said member, sensing means axially mounted on said gears for sensing said set-ups, card supply magazines for said master and detail cards, means for feeding said master and detail cards from said card magazines to said sensing means, and means controlled by said reading means for varying the operation of said card feeding means.

3. In a machine of the character described, means for individually sensing successive cards, a sequence unit for setting up the result of said sensings, means including a pin box operable to transfer a sensing to the sequence unit to enable said sequence unit to compare simultaneously the data designation of two successive sensings, reading means for detecting the sequential relationship between the values of said set-ups, a card supply magazine for said cards, means for feeding cards from said magazine to said sensing means, a plurality of pockets for receiving cards, means for guiding said cards to said receiver pockets, and means controlled by said reading means for selectively operating said guiding means.

4. In a machine of the character described, means for individually sensing successive cards, a sequence unit for setting up the result of said sensings including two sets of pins one of said sets for receiving data from one card, and the other set for receiving data from the following card, means including a pin box operable to transfer a sensing to the sequence unit to enable said sequence unit to compare simultaneously the data designations of two successive sensings, reading means for detecting the sequential relationship between the values of said set-ups, a card supply magazine for said cards, means for feeding cards from said magazine to said sensing means, a plurality of pockets for receiving cards, means for guiding said cards to said receiver pockets, and means controlled by said reading means for selectively operating said guiding means.

5. In a machine of the character described, means for individually sensing successive cards, a sequence unit for setting up the result of said sensings, means operable to enable said sequence unit to compare simultaneously the data designations of two successive cards, reading means for detecting a difference in the values of said set-ups including a movable and a stationary rack, a member adapted to travel the length of said racks, a pair of gears pivotally mounted on said member, and sensing means axially mounted on said gears for sensing said set-ups, a card supply magazine for said cards, means for feeding cards from said magazine to said sensing means, a plurality of pockets for receiving cards, means for guiding said cards to said receiver pockets, and means controlled by said reading means for selectively operating said guiding means.

6. In a machine of the character described, means for individually sensing successive cards, a sequence unit for setting up the result of said sensings including two sets of pins one of said sets for receiving data from one card, and the other set for receiving data from the following card, means operable to enable said sequence unit to compare simultaneously the data designations of two successive cards, reading means for detecting a difference in the values of said set-ups including a movable and a stationary rack, a member adapted to travel the length of said racks, a pair of gears pivotally mounted on said member, sensing means axially mounted on said gears for sensing said set-ups, a card supply magazine for said cards, means for feeding cards from said magazine to said sensing means, a plurality of pockets for receiving cards, means for guiding said cards to said receiver pockets, and means controlled by said reading means and said movable rack for selectively operating said guiding means.

7. In a machine of the character described, means for individually sensing successive cards, a sequence unit for setting up the result of said sensings, means operable to enable said sequence unit to compare simultaneously the data designations of two successive cards, reading means for detecting a difference in the values of said set-ups, including a movable and a stationary rack, a member adapted to travel the length of said racks, a pair of gears pivotally mounted on said member, sensing means axially mounted on said gears for sensing said set-ups, a card supply magazine for said cards, means for feeding cards from said magazine to said sensing means, a plurality of pockets for receiving cards, means for guiding said cards to said receiver pockets, and means controlled by said reading means and said movable rack for selectively operating said guiding means.

8. In a machine of the character described, means for individually sensing successive cards, a sequence unit for setting up the result of said sensings, including two sets of pins one of said sets for receiving data from one card, and the other set for receiving data from the following card, means operable to enable said sequence unit to compare simultaneously the data designations of two successive cards, reading means for detecting a difference in the values of said set-ups including a movable and a stationary rack, a member adapted to travel the length of said racks, a pair of gears pivotally mounted on said member, sensing means axially mounted on said gears for sensing said set-ups, a card supply magazine for said cards, means for feeding cards from said magazine to said sensing means, a plurality of pockets for receiving cards, means for guiding said cards to said receiver pockets, and means controlled by said reading means and said movable rack for selectively operating said guiding means.

9. In a machine of the character described, means for individually sensing successive cards, a sequence unit for setting up the result of said sensings, including two sets of pins one of said sets for receiving data from one card, and the other set for receiving data from the following card, means including a pin box operable to transfer a sensing to the sequence unit to enable said sequence unit to compare simultaneously the data designations of two successive sensings, reading means for detecting the sequential relationship between the values of said set-ups, a card supply magazine for said cards, means for feeding cards from said magazine to said sensing means, a plurality of pockets for receiving cards, means for guiding said cards to said receiver pockets, and a single file segregation control mechanism operable under control of said reading means for selectively operating said guiding means.

10. In a machine of the character described, means for individually sensing successive cards, a sequence unit for setting up the result of said sensings, means operable to enable said sequence unit to compare simultaneously the data designations of two successive cards, reading means for detecting a difference in the values of said set-ups, including a movable and a stationary rack, a member adapted to travel the length of said racks, a pair of gears pivotally mounted on said member, and sensing means axially mounted on said gears for sensing said set-ups, a card supply magazine for said cards, means for feeding cards from said magazine to said sensing means, individual means for feeding signal cards, means controlled by said reading means and said movable rack for varying the operations of said signal card feeding means, a plurality of pockets for receiving cards, means for guiding said cards to said receiver pockets, and a single file segregation control mechanism operable under control of said reading means and said movable rack for selectively operating said guiding means.

11. In a machine of the character described, means for individually sensing successive cards, a sequence unit for setting up the result of said sensings, including two sets of pins one of said sets for receiving data from one card, and the other set for receiving data from the following card, means operable to enable said sequence unit to compare simultaneously the data designations of two successive cards, reading means for detecting a difference in the values of said set-ups including a movable and a stationary rack, a member adapted to travel the length of said racks, a pair of gears pivotally mounted on said member, sensing means axially mounted on said gears for sensing said set-ups, a card supply magazine for said cards, means for feeding cards from said magazine to said sensing means, individual means for feeding signal cards, means controlled by said reading means and said movable rack for varying the operation of said signal card feeding means, a plurality of pockets for receiving cards, means for guiding said cards to said receiver pockets, and a single file segregation control mechanism operable under control of said reading and said movable rack means for selectively operating said guiding means.

12. A machine of the character described, means for individually sensing successive cards, a sequence unit for setting up the results of said sensings including two sets of pins one of said sets for receiving data from one card, and the other set for receiving data from the following card, means operable to enable said sequence unit to compare simultaneously the data designations of two successive sensings, reading means for detecting the sequential relationship between the values of said set-ups, a card supply magazine for said cards, means for feeding cards from said magazine to said sensing means, a plurality of pockets for receiving cards, and a single file segregation control mechanism operable under control of said reading means for selectively operating said guiding means.

13. In a machine of the character described means for individually sensing successive cards, a sequence unit for setting up the results of said sensing, means operable to enable the sequence unit to compare simultaneously the data designations of two successive cards, reading means for detecting a difference in the values of said set-ups including a movable and a stationary rack, a member adapted to travel the length of said racks, a pair of gears pivotally mounted on said member, and sensing means axially mounted on said gears for sensing said set-ups, a card supply magazine for said cards, means for feeding cards from said magazine to said sensing means, individual means for feeding signal cards, a sequence feeding control mechanism operable under control of said reading means and said movable rack for varying the operations of said signal card feeding means, a plurality of pockets for receiving cards, means for guiding said cards to said receiver pockets, and a single file segregation control mechanism operable under control of said reading means and said movable rack for selectively operating said guiding means.

14. In a machine of the character described, means for individually sensing successive cards, a sequence unit for setting up the results of said sensings including two sets of pins one of said sets for receiving data from one card, the other set for receiving data from the following card, means operable to enable said sequence unit to compare simultaneously the data designations of two successive cards, reading means for detecting a difference in the values of said set-ups including a movable and a stationary rack, a member adapted to travel the length of said racks, a pair of gears pivotally mounted on said member, sensing means axially mounted on said gears for reading said set-ups, a card supply magazine for said cards, means for feeding cards from said magazine to said sensing means, individual means for feeding signal cards, sequence feeding control mechanism operable under control of said reading means and said movable rack for varying the operation of said signal card feeding means, a plurality of pockets for receiving cards, means for guiding said cards to said receiver pockets, and a single file segregation control mechanism operable under control of said reading means and said movable rack for selectively operating said guiding means.

15. In a machine of the class described, means for individually sensing master and detail cards, a sequence unit for setting up the result of said sensings including two sets of pins one of said sets for receiving data from the master card, and the other set for receiving data from the detail card, reading means for detecting a difference in the values of said set-ups including a movable and a stationary rack, a member adapted to travel the length of said racks, a pair of gears pivotally mounted on said member and sensing means axially mounted on said gears for reading said set-ups, card supply magazines for said master and detail cards, means for feeding said master and detail cards from said magazines to said sensing means, and a sequence feeding control mechanism operable under control of said reading means and said movable rack for varying the operation of said card feeding means.

16. In a machine of the class described, means for individually sensing master and detail cards, a sequence unit for setting up the result of said sensings including two sets of pins one of said sets for receiving data from the master card and the other set for receiving data from the detail card, reading means for detecting a difference in the values of said set-ups including a movable and a stationary rack, a member adapted to travel the length of said racks, a pair of gears pivotally mounted on said member and sensing means axially mounted on said gears for sensing said set-ups, card supply magazines for said master and detail cards, means for feeding said master and detail cards from said magazines to said sensing means, a sequence feeding control mechanism operable under control of said reading means and said movable rack for varying the operation of said card feeding means, a plurality of pockets for receiving cards, means for guiding said cards to said receiver pockets, and a sequence segregation control mechanism operable under control of said reading means and said movable rack for selectively operating said guiding means.

17. In a machine of the class described, means for individually sensing master and detail cards, a sequence unit for setting up the result of said sensings, reading means for detecting the difference in the values of said set-ups including a movable and a stationary rack, a member adapted to travel the length of said racks, a pair of gears pivotally mounted on said member, and sensing means axially mounted on said gears for sensing said set-ups, card supply magazines for said master and detail cards, means for feeding said master and detail cards from said magazines to said sensing means, and a sequence feeding control mechanism operable under control of said reading means and said movable rack for varying the operation of said card feeding means.

18. In a machine of the class described, means for individually sensing master and detail cards, a sequence unit for setting up the result of said sensings, reading means for detecting the difference in the values of said set-ups including a movable and a stationary rack, a member adapted to travel the length of said racks, a pair of gears pivotally mounted on said member, sensing means axially mounted on said gears for sensing said set-ups, card supply magazines for said master and detail cards, means for feeding said master and detail cards from said magazines to said sensing means, a sequence feeding control mechanism operable under control of said reading means and said movable rack for varying the operation of said card feeding means, a plurality of pockets for receiving cards, means for guiding said cards to said receiver pockets, and a sequence segregation control mechanism operable under control of said reading means and said movable rack for selectively operating said guiding means.

19. In a machine of the class described, means for individually sensing master and detail cards, a sequence unit for setting up the result of said sensings including two sets of pins one of said sets for receiving data from the master card, and the other set for receiving data from the detail card, reading means for detecting the sequential relationship between the values of said set-ups, card supply magazines for said master and detail cards, means for feeding said master and detail cards from said magazines to said sensing means, and a sequence feeding control mechanism presettable to disable a selected one of said feeding means upon the occurrence of an equal relationship and operable under control of said reading means for varying the operation of said card feeding means in accordance with the nature of a detected unequal relationship.

20. In a machine of the class described, means for individually sensing master and detail cards, a sequence unit for setting up the result of said sensings including two sets of pins one of said sets for receiving data from the master card, and the other set for receiving data from the detail card, reading means for detecting the sequential relationship between the values of said set-ups, card supply magazines of said master and detail cards, means for feeding said master and detail cards from said magazines to said sensing means, a sequence feeding control mechanism presettable to selectively enable either or both of said feeding means upon the occurrence of equal relationships and operable under control of said reading means for varying the operation of said card feeding means in accordance with the nature of a detected unequal relationship, a plurality of pockets for receiving cards, means for guiding said cards to said receiver pockets, and a sequence segregation control mechanism operable under control of said reading means for selectively operating said guiding means.

21. In a machine of the class described, means for individually sensing master and detail cards, a sequence unit for setting up the result of said sensings, including a plurality of slides and a finger movable thereby, reading means for detecting a difference in the values of said set-ups including a movable and a stationary rack, a member adapted to travel the length of said racks, a pair of gears pivotally mounted on said member, sensing means axially mounted on said gears for sensing the position of said finger, card supply magazines for said master and detail cards, means for feeding said master and detail cards from said magazines to said card sensing means, and means controlled by said reading means and said movable rack for varying the operation of said card feeding means.

22. In a machine of the character described, means for individually sensing successive cards, a sequence unit for setting up the results of said sensings including two sets of pins one of said sets for receiving data from one card, and the other set for receiving data from the following card, a plurality of slides and a finger movable thereby, means operable to enable said sequence unit to compare simultaneously the data designations of two successive cards, reading means for detecting a difference in the values of said set-ups including a movable and a stationary rack, a member adapted to travel the length of said racks, a pair of gears pivotally mounted on said member, sensing means axially mounted on said gears for sensing the position of said finger, card supply magazine for said cards, means for feeding cards from said magazine to said card sensing means, a plurality of pockets for receiving cards, means for guiding said cards to said receiver pockets, and a single file segregation control mechanism operable under control of said reading means and said movable rack for selectively operating said guiding means.

23. In a machine of the class described, means for individually sensing master and detail cards, a sequence unit for setting up the result of said sensings including two sets of pins one of said sets for receiving data from the master card, and the other set for receiving data from the detail card, a plurality of slides and a finger movable thereby, reading means for detecting a difference in the values of said set-ups including a movable and a stationary rack, a member adapted to travel the length of said racks, a pair of gears pivotally mounted on said member and sensing means axially mounted on said gears for sensing the position of said finger, card supply magazines for said master and detail cards, means for feeding said master and detail cards from said magazines to said card sensing means, and a sequence feeding control mechanism operable under control of said reading means and said movable rack for varying the operation of said card feeding means.

24. In a machine of the class described, means for individually sensing master and detail cards, a sequence unit for setting up the result of said sensings including two sets of pins one of said sets for receiving data from the master card and the other set for receiving data from the detail card, a plurality of slides and a finger movable thereby, reading means for detecting a difference in the values of said set-ups including a movable and a stationary rack, a member adapted to travel the length of said racks, a pair of gears pivotally mounted on said member and sensing means axially mounted on said gears for sensing the position of said finger, card supply magazines for said master and detail cards, means for feeding said master and detail cards from said magazines to said card sensing means, a sequence feeding control mechanism operable under control of said reading means and said movable rack for varying the operation of said card feeding means, a plurality of pockets for receiving cards, means for guiding said cards to said receiver pockets, and a sequence segregation control mechanism operable under control of said reading means and said movable rack for selectively operating said guiding means.

25. In a machine of the class described, means for individually sensing master and detail cards, a sequence unit for setting up the result of said sensings including a plurality of slides and a finger movable thereby, reading means for detecting the difference in the values of said set-ups including a movable and a stationary rack, a member adapted to travel the length of said racks, a pair of gears pivotally mounted on said member, sensing means axially mounted on said gears for sensing the position of said finger, card supply magazines for said master and detail cards, means for feeding said master and detail cards from said magazines to said card sensing means, a sequence feeding control mechanism operable under control of said reading means and said movable rack for varying the operation of said card feeding means, a plurality of pockets for receiving cards, means for guiding said cards to said receiver pockets, and a sequence segregation control mechanism operable under control of said reading means and said movable rack for selectively operating said guiding means.

26. In a machine of the character described, a single record sensing means, a sequence unit having separate sections for receiving the data designations of successive sensings of said sensing means, means for immediately transmitting the data designations of each sensing to one of said sections, means including a pin box operable to transmit each of said sensings to the other section of the sequence unit, said pin box delaying the transmission of each sensing to the corresponding section of the sequence unit to enable said sequence unit to compare simultaneously the progressive orders of the data designations of two successive sensings, and means for locking the sensing of said pin box in said sequence unit.

27. In a machine of the character described, the combination with a card sensing means of a sequencing unit having a plurality of banks for receiving the data designations of successive sensings of said sensing means, said sequence unit comparing simultaneously the progressive order of said successively sensed data, a pin box, a wiring unit for transferring said successive sensing actions to the pin box and to at least one bank of said sequence unit, means for locking the sensing received by said pin box in at least one other bank of said sequence unit, and means for delaying transfer of the sensing of said pin box to said other bank.

28. In a machine of the character described, a single sensing means and sequence unit for receiving the data designations of successive sensings of said sensing means in combination with means to transfer one of said sensings to the sequence unit to enable said sequence unit to compare simultaneously the progressive order of data designations of two successive sensings, said means including a wiring unit transferring said sensings to a pin box and one bank of said sequence unit, means for locking the sensing of said pin box in the other bank of said sequence unit, means for delaying the transfer of sensings of said pin box to said latter bank, and means for retracting the locked sensings in said latter bank after the sequential comparison of the data designations in both of said banks.

29. In a machine of the character described, sensing means and a sequence unit for receiving the data designations of successive sensings of said sensing means, in combination with means to transfer one of said sensings to the sequence unit to enable said sequence unit to compare simultaneously the progressive order of data designations of successive card sensings, said means including a wiring unit transferring said sensings to a pin box and one bank of said sequence unit, means for locking sensings of said pin box in another bank of said sequence unit, said locking means being effective after the release of the same sensing from said former bank and while a successive sensing from said sensing means is being transferred to said former bank, and means for releasing said locking means after the sequential comparison of successive set-ups in said banks.

30. In a machine of the character described, sensing means and a sequence unit for receiving the data designations of two successive sensings of said sensing means in combination with means to transfer one of said sensings to the sequence unit to enable said sequence unit to compare simultaneously data designations of two successive sensings, said means including a wiring unit transferring said sensings to a pin box and one bank of said sequence unit, means for delaying transfer of the sensing of said pin box to another bank of said sequence unit, means for locking sensings of said pin box in said latter bank, said locking means being maintained operable after the release of said sensings from said former bank, successive sensings from said sensing means being transmitted to said former bank and said pin box, and means for releasing said locking means after sequential comparison of said banks.

31. In a machine of the character described, means for individually sensing successive cards, a sequence unit for setting up the result of said sensings, means operable to enable said sequence unit to compare simultaneously the data designations of successive cards, reading means for detecting a difference in the values of said set-ups including a first member adapted to travel across said sequence unit, means carried by the first member displaceable according to said set-ups, a second member for translating said displacements and control means operated by said displacements, a card supply magazine for said cards, means for feeding cards from said magazine to said sensing means, separate feeding means for advancing signal cards said control means varying the operation of said separate card feeding means, a plurality of pockets for receiving cards, means for guiding said cards to said receiver pockets, and means controlled by said reading means for selectively operating said guiding means.

32. In a machine of the character described, means for individually sensing successive cards, a sequence unit for setting up results of said sensings, means operable to enable said sequence unit to compare simultaneously data designations of two successive cards, reading means for detecting a difference in the values of said set-ups including a first member adapted to travel the length of said set-ups to said sequence unit, a second member pivotally mounted on said first member, said second member adapted to sense said set-ups and rotate about its pivotal connection with said first member, a third member translating the rotation of said second member, card feeding means including separate means for feeding signal cards, a sequence feeding control mechanism operable under control of said rotating means for varying the operation of said card feeding means, a plurality of pockets for receiving cards, means for guiding said cards to said receiver pockets, and means controlled by said reading means for selectively operating said guiding means.

33. In a machine of the character described, means for sensing successive cards, a sequence unit for setting up the result of said sensings, means operable to enable said sequence unit to compare simultaneously the data designations of successive cards, reading means for detecting the difference in values of said set-ups including a first member adapted to travel across said sequence unit, means carried by the first member displaceable according to said set-ups, a second member for translating said displacements and a single file segregation control mechanism operable under control of said displacements, means for feeding cards to said sensing means, separate feeding means for advancing signal cards, means controlled by said reading means for varying the operation of said separate card feeding means, a plurality of pockets for receiving cards, and means for guiding said cards to said receiver pockets, said guiding means being operable under control of said reading means.

34. In a machine of the class described, means for individually sensing different cards, sequencing means for selectively setting up the result of said sensings, reading means for detecting the progressive order of said set-ups, card supply magazines for said cards, means for feeding cards from said magazines to said sensing means, said reading means controlling said feeding means, and means controlled by said reading means for selectively feeding cards having equal values as well as progressive order in either card supply magazines.

35. In a machine of the character described, means for individually sensing different cards, means for setting up the result of said sensings, reading means for detecting the progressive order of the values of said set-ups, card supply magazines, means for feeding cards from said magazines to said sensing means, means controlled by said reading means for varying the operation of said card feeding means, a plurality of pockets for receiving cards, means for guiding said cards to said receiver pockets from respective magazines, means for interfiling the cards of said magazines in sequence, and means controlled by said reading means for selectively operating said guiding means and said interfiling means.

36. In a machine of the class described, means for individually sensing master and detail cards, means for feeding said master and detail cards to said sensing means, means for comparing the data sensed by the respective sensing means, a feed control member settable under control of said comparing means for selectively enabling the operation of the respective feeding means in accordance with compared relationships, card stopping means associated with each feeding means for retaining a card in sensing position and retractable for releasing a card upon completion of a sensing operation, a disabling member associated with each of said stopping means and operable to prevent the retraction of the associated stopping means upon the completion of a sensing operation, said members being operated under the influence of said feed control member to prevent retraction of the stopping means for the feeding means which is disabled, and means controlled by said comparing means in accordance with a predetermined compared relationship for preventing the operation of one of said disabling members independently of the influence of said feed control member, said last mentioned means enabling the release of a card from sensing position when the associated feeding means is disabled.

37. In a machine of the class described, means for individually sensing master and detail cards, individual means for feeding said master and detail cards to the respective sensing means, comparing means for determining matching or non-matching relationships between the sensed data, means for detecting the sequential relationship between the same sensed data, a feed control member settable under the joint control of said comparing means and said sequence detecting means for selectively enabling said feeding means in accordance with compared relationships, said member being controlled by said comparing means upon the occurrence of matching relationships and also being controlled by said sequence detecting means according to a pre-determined sequential order upon the occurrence of non-matching relationships, card stopping means associated with each sensing means for retaining the card in sensing position during each sensing operation and retractable for releasing the card from sensing position upon the completion of a sensing operation, disabling members associated with each of said stopping means and operable under the influence of said feed control member to prevent retraction of the stopping means associated with the feeding means which is disabled, and means controlled by said comparing means for preventing the operation of one of said disabling members independently of the influence of said feed control member, said last mentioned means enabling the release of a card from sensing position when the associated feeding means is disabled.

38. In a machine of the class described, a sequencing unit comprising a plurality of banks of pins, said banks being mounted in opposed paired relation, the pins of each pair of opposed banks being longitudinally depressible in accordance with representations of data to be compared, a yieldingly releasable sensing member for each opposed pair of said banks, said member when released being adapted to traverse the positions of the pins of each pair of banks and to engage a depressed pin of either of said banks, the yielding movement of said member laterally displacing the pin engaged by said member, a shiftable element for each of said banks, said element being shifted in response to the lateral displacement of any pin of the associated bank, and an indicating member for each pair of said opposed banks, said indicating member being pivotally connected to the shiftable members for the associated pair of banks and rotatable in one direction by the shiftable member associated with one bank and in the opposite direction by the shiftable member associated with the opposed bank, whereby the sequential relationship between the data represented by the pins of the opposed banks is indicated by the rotated position of said indicating member.

39. In a machine of the class described, a sequencing unit comprising banks of displaceable pins mounted in opposed paired relation, a sensing slide for each opposed pair of said banks, stops on said slides including one for each bank of the opposed pair, each stop being disposed to engage a depressed pin of the associated bank, said stops upon the release of said sensing slide laterally displacing the pin engaged by said stop, a shiftable member associated with each bank of the opposed pair, each responsive to the lateral displacement of any pin of the associated bank, and a pivotal indicating member for each pair of opposed banks having separate pivotal connections with the said shiftable elements, said indicating member being rotatable in one or another direction depending upon which of said shiftable members connected thereto is actuated, whereby the compared relation between the settings of pins of the opposed banks is indicated by the rotated position of said indicating member.

40. In a sequencing unit, a plurality of pins arranged in separate banks in opposed paired relation, the pins of each bank being longitudinally settable to represent data to be compared, a sensing slide for each pair of said opposed banks, said slide when released being engageable with the set pin of either bank and effective for laterally displacing the engaged pin, means associated with each bank shiftable in response to the lateral displacement of any pin of the associated bank, and an indicating member for each pair of said opposed banks, said indicating member having separate pivotal connections with said shiftable means, the actuation of either of said shiftable means causing rotation of said indicating member about its pivotal connection with the other shiftable means, the direction of rotation of said indicating member indicating the sequential relationship between the data represented by the setting of said pins.

41. In a machine of the class described, a sequencing unit comprising a plurality of pins arranged in banks in opposed paired relation, each pin being laterally displaceable within said unit and longitudinally settable to represent data to be compared, the successively disposed pins of each bank being representative of values in an ascending order, a sensing slide for each opposed pair of said banks, said slides being yieldably releasable to traverse the positions of said pins in succession and including an abutment portion for each of the associated banks engageable upon release of the slide with a set pin of the associated bank, the engagement of said abutment portion with a pin causing lateral displacement of the engaged pin and limiting the continued release of said slide, a shiftable element associated with each bank actuable in response to the lateral displacement of any pin of the associated bank, and an indicating member for each pair of said opposed banks having separate pivotal connections with each of said shiftable elements, said indicating member being rotatable in one or another direction upon actuation of the corresponding one of said shiftable elements according to which one of said paired banks is effective for limiting the release of said sensing slide, whereby the rotated position of said indicating member indicates the sequential relationship between the data represented by the said pins of said opposed banks.

42. In a sequencing unit according to claim 41, automatic zero indicating mechanism including a slide limiting portion formed on the pin of each bank settable to represent the value zero, said limiting portion normally engaging the associated sensing slide when said zero representative pin is in a normal non-set position, and a release member carried by each of said zero representative pins, said release member being disposed for engagement by all other pins of the same bank, said other pins of same bank when set causing actuation of said release member to disengage the limiting portion of the zero representative pin from the associated sensing slide.

43. In a sequencing unit according to claim 41, means for disabling selected ones of said sensing slides, said disabling means including an interponent member disposed adjacent each slide, said members being manually adjustable to engage the associated slide when in an unreleased position and effective when engaged to prevent the release of the associated slide.

44. In a sequence unit according to claim 41, a separate locking member associated with the pins of one bank, said member being shiftable to maintain the data representative set up of said bank throughout the sequential comparing operation of the associated sensing slide, and retract means engageable with each lock-out member and operable to shift each lock-out member to unlocking position to release the data representative set-up from the associated bank upon completion of the sequential comparing operation.

45. In a machine of the class described, means for individually sensing cards prearranged in separate card groups, individual means for feeding cards of each group to their respective sensing means, comparing means associated with said sensing means for determining match or nonmatch relationships between cards of the respective groups, a sequence unit operating in response to the same sensed data as said comparing means for determining the sequential relationship between the unmatched cards of the respective groups, a feed control member having a plurality of effective control settings for selectively enabling the operation of said individual feeding means, said control member in one setting enabling the simultaneous operation of said feeding means and in other settings selectively disabling one or the other of said individual feeding means, a control device operated by said comparing means, said control device including a plurality of individually selectable control elements, each of said elements operating to determine different control settings of said feed control member as the result of matched relationships determined by said comparing means, and feed control means operated by said sequence unit to effect the setting of said feed control member to selectively enable the individual feeding means for the group having the sensed card of lower sequential order, said last mentioned means being effective in conjunction with any one of said control elements which is selected for operation by said comparing means.

46. In a machine of the class described, means for individually sensing cards prearranged in separate card groups, individual means for feeding cards of each group to their respective sensing means, comparing means associated with said sensing means for determining match or nonmatch relationships between cards of the respective groups, a sequence unit operating in response to the same sensed data as said comparing means for determining the sequential relationship between the unmatched cards of the respective groups, a feed control member having a plurality of effective control settings for selectively enabling the operation of said individual feeding means, said control member in one setting enabling the simultaneous operation of said feeding means and in other settings selectively disabling one or the other of said individual feeding means, a control device operated by said comparing means, said control device including a plurality of individually selectable control elements, each of said elements operating to determine different control settings of said feed control member as the result of matched relationships determined by said comparing means, feed control means operated by said sequence unit to effect the control setting of said feed control member to selectively enable the individual feeding means for the group having the sensed card of lower sequential order, said last mentioned means being effective in conjunction with any one of said control elements which is selected for operation by said comparing means, and means presettable to selectively enable predetermined ones of said control elements operated by said comparing means, said presettable means in one setting enabling the simultaneous operation of both feeding means upon the occurrence of matching relationships and in other settings selectively enabling a predetermined one of said separate feeding means upon the occurrence of matching relationships.

References Cited in the file of this patent

UNITED STATES PATENTS

| Number | Name | Date |
| --- | --- | --- |
| 2,158,872 | Johnstone et al. | May 16, 1939 |
| 2,211,094 | Braun | Aug. 13, 1940 |
| 2,280,924 | McDonnell | Apr. 28, 1942 |
| 2,359,670 | Page | Oct. 3, 1944 |
| 2,364,202 | Ford | Dec. 5, 1944 |
| 2,372,909 | Page et al. | Apr. 3, 1945 |
| 2,379,828 | Rubidge et al. | July 3, 1945 |
| 2,496,124 | Ferry | Jan. 31, 1950 |
| 2,562,252 | Wockenfuss | July 31, 1951 |
| 2,615,568 | Constance | Oct. 28, 1952 |

FOREIGN PATENTS

| Number | Country | Date |
| --- | --- | --- |
| 655,629 | Great Britain | July 25, 1951 |